US008926484B1

(12) United States Patent  
Comb et al.

(10) Patent No.: US 8,926,484 B1  
(45) Date of Patent: Jan. 6, 2015

(54) HEAD TOOL CHANGER FOR USE WITH DEPOSITION-BASED DIGITAL MANUFACTURING SYSTEMS

(75) Inventors: James W. Comb, Hamel, MN (US); Joseph E. Labossiere, Rogers, MN (US); Michael D. Bosveld, Bloomington, MN (US); David G. Bocek, Plymouth, MN (US); Max Peters, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 945 days.

(21) Appl. No.: 13/074,523

(22) Filed: Mar. 29, 2011

Related U.S. Application Data

(60) Provisional application No. 61/318,430, filed on Mar. 29, 2010.

(51) Int. Cl.  
*B29C 67/00* (2006.01)  
*B23Q 3/155* (2006.01)

(52) U.S. Cl.  
CPC ............ *B23Q 3/155* (2013.01); *B29C 67/0051* (2013.01); *B23Q 3/15506* (2013.01); *B23Q 3/15566* (2013.01); *Y10S 483/901* (2013.01)  
USPC .................. 483/16; 700/119; 483/901; 483/4; 483/10; 425/162; 425/186; 425/190; 425/225; 425/375

(58) Field of Classification Search  
CPC .. B23Q 3/155; B23Q 3/15506; B23Q 3/1556; B23Q 3/15566  
USPC .......... 700/118, 119, 120; 425/162, 166, 186, 425/190, 192 R, 225, 227, 375; 483/4, 7, 10, 483/11, 16, 901  
See application file for complete search history.

(56) References Cited

U.S. PATENT DOCUMENTS

| | | | |
|---|---|---|---|
| 5,121,329 A | 6/1992 | Crump | 364/468 |
| 5,303,141 A | 4/1994 | Batchelder et al. | 364/149 |
| 5,340,433 A | 8/1994 | Crump | 156/578 |
| 5,426,722 A | 6/1995 | Batchelder | 395/80 |
| 5,587,913 A | 12/1996 | Abrams et al. | 364/468.26 |
| 5,764,521 A | 6/1998 | Batchelder et al. | 364/475.01 |
| 5,779,609 A * | 7/1998 | Cullen et al. | 483/69 |
| 5,939,008 A | 8/1999 | Comb et al. | 264/308 |
| 5,968,561 A | 10/1999 | Batchelder et al. | 425/375 |
| 6,028,410 A | 2/2000 | Leavitt et al. | 318/568.15 |
| 6,054,077 A | 4/2000 | Comb et al. | 264/40.7 |
| 6,491,612 B1 * | 12/2002 | Kurup et al. | 483/16 |
| 6,533,594 B1 * | 3/2003 | Kurup | 439/197 |
| 6,722,872 B1 | 4/2004 | Swanson et al. | 425/225 |
| 6,776,602 B2 | 8/2004 | Swanson et al. | 425/376.1 |
| 6,840,895 B2 * | 1/2005 | Perry et al. | 483/1 |
| 6,923,634 B2 | 8/2005 | Swanson et al. | 425/169 |
| 7,122,246 B2 | 10/2006 | Comb et al. | 428/364 |
| 7,625,198 B2 | 12/2009 | Lipson et al. | |
| 7,641,461 B2 | 1/2010 | Khoshnevis | |

(Continued)

*Primary Examiner* — Erica E Cadugan  
*Assistant Examiner* — Michael Vitale  
(74) *Attorney, Agent, or Firm* — Brian R. Morrison; Westman, Champlin & Koehler, P.A.

(57) ABSTRACT

A head tool changer for use with a deposition-based digital manufacturing system, the head tool changer comprising a tooling unit configured to retain a deposition head, a grip unit configured to engage with tooling unit and to relay electrical power to the tooling unit, and a master unit operably mounted to a gantry and configured to engage with the tooling unit and to relay electrical power to the tooling unit.

14 Claims, 30 Drawing Sheets

(56) References Cited

U.S. PATENT DOCUMENTS

| | | | |
|---|---|---|---|
| 7,939,003 B2 | 5/2011 | Bonassar et al. | |
| 2007/0003656 A1 | 1/2007 | LaBossiere et al. | 425/375 |
| 2007/0228590 A1 | 10/2007 | LaBossiere et al. | 264/40.1 |
| 2007/0263760 A1* | 11/2007 | Taillandier | 376/261 |
| 2008/0213419 A1 | 9/2008 | Skubic et al. | 425/113 |
| 2009/0035405 A1 | 2/2009 | Leavitt | 425/97 |
| 2009/0177309 A1 | 7/2009 | Kozlak | 700/119 |
| 2010/0096485 A1 | 4/2010 | Taatjes et al. | 242/171 |
| 2010/0096489 A1 | 4/2010 | Taatjes et al. | 242/520 |
| 2010/0100222 A1 | 4/2010 | Skubic et al. | 700/110 |
| 2010/0100224 A1 | 4/2010 | Comb et al. | 700/118 |
| 2010/0161105 A1 | 6/2010 | Blake | 700/119 |

* cited by examiner

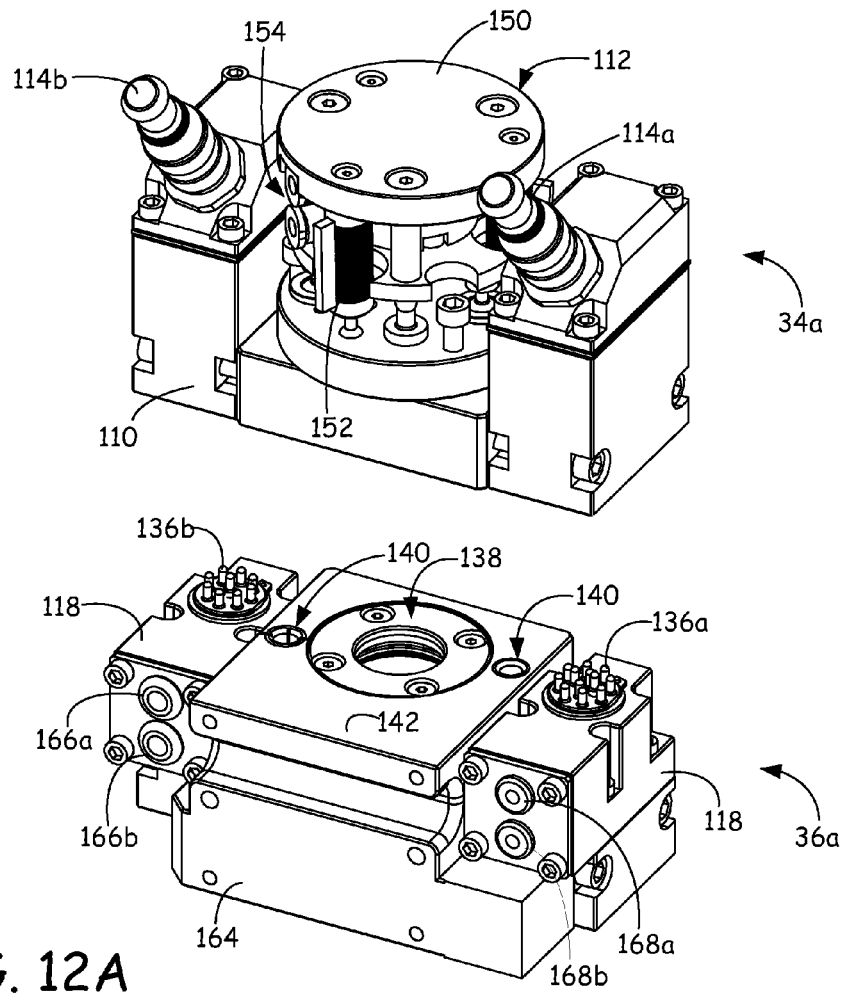
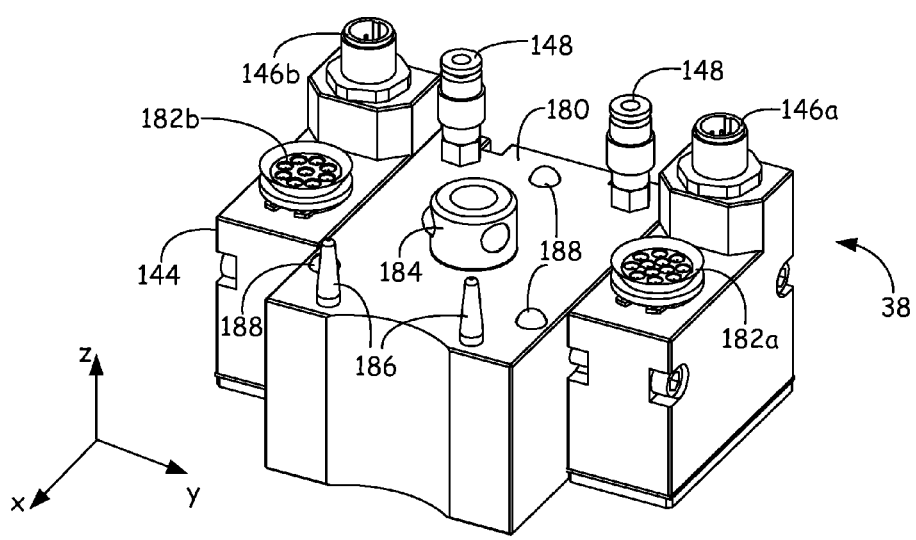
FIG. 12A

HEAD TOOL CHANGER FOR USE WITH DEPOSITION-BASED DIGITAL MANUFACTURING SYSTEMS

CROSS-REFERENCE TO RELATED APPLICATION(S)

This application claims priority to U.S. Provisional Patent Application No. 61/318,430, filed on Mar. 29, 2010, and entitled "HEAD TOOL CHANGER FOR USE WITH DEPOSITION-BASED DIGITAL MANUFACTURING SYSTEMS", the disclosure of which is incorporated by reference in its entirety.

BACKGROUND

The present disclosure relates to deposition-based digital manufacturing systems for building three-dimensional (3D) models with layer-based additive techniques. In particular, the present invention relates to devices for loading multiple deposition heads to deposition-based digital manufacturing systems, such as extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

An aspect of the present disclosure is directed to a head tool changer for use with a deposition-based digital manufacturing system. The head tool changer includes a tooling unit configured to retain a deposition head of the system, and an actuator assembly operably mounted to the system, where at least a portion of the actuator assembly is configured to move along an axis. The head tool changer also includes a grip unit secured to the actuator assembly and configured to engage with tooling unit and to relay electrical power to the tooling unit, and a master unit operably mounted to a gantry of the system, where the master unit is configured to engage with the tooling unit and to relay electrical power to the tooling unit.

Another aspect of the present disclosure is directed to a head tool changer for use with a deposition-based digital manufacturing system, where the head tool changer includes a plurality of tooling units, each being configured to retain a deposition head of the system, and a plurality of actuator assemblies operably mounted to the system, where at least a portion of each of the plurality of actuator assemblies is configured to move along an axis. The head tool changer also includes a plurality of grip units secured to the plurality of actuator assemblies, where each grip unit is configured to engage with one of the tooling units, and a master unit operably mounted to a gantry of the system, where the tooling units are configured to interchangeably engage with the master unit.

Another aspect of the present disclosure is directed to a method for changing deposition heads in a deposition-based digital manufacturing system. The method includes providing a grip unit engaged with a tooling unit, where the tooling unit is secured to one of the deposition heads, relaying electrical power through the grip unit and the tooling unit to the secured deposition head, and engaging the tooling unit with a master unit that is operably mounted to a gantry of the system. The method also includes cutting the relay of the electrical power through the grip unit and the tooling unit, relaying electrical power through the master unit and the tooling unit to the secured deposition head while the tooling unit is engaged with the master unit, and disengaging the grip unit from the tooling unit.

BRIEF DESCRIPTION OF THE DRAWINGS

FIG. 12A is a top perspective view of the grip unit, the tooling unit, and the master unit.

DETAILED DESCRIPTION

The present disclosure is directed to a head tool changer that may be mounted to a direct digital manufacturing system, such as a deposition-based digital manufacturing system. The head tool changer is configured to interchangeably load multiple deposition heads to a gantry of the digital manufacturing system, where the multiple deposition heads may be used to build 3D models and support structures using a layer-based additive technique. As discussed below, this allows 3D models and support structures to be built with multiple materials, may reduce transition times when switching materials, and may allow operators to service and repair idle deposition heads while 3D model and support structures are being built.

Figure 1:
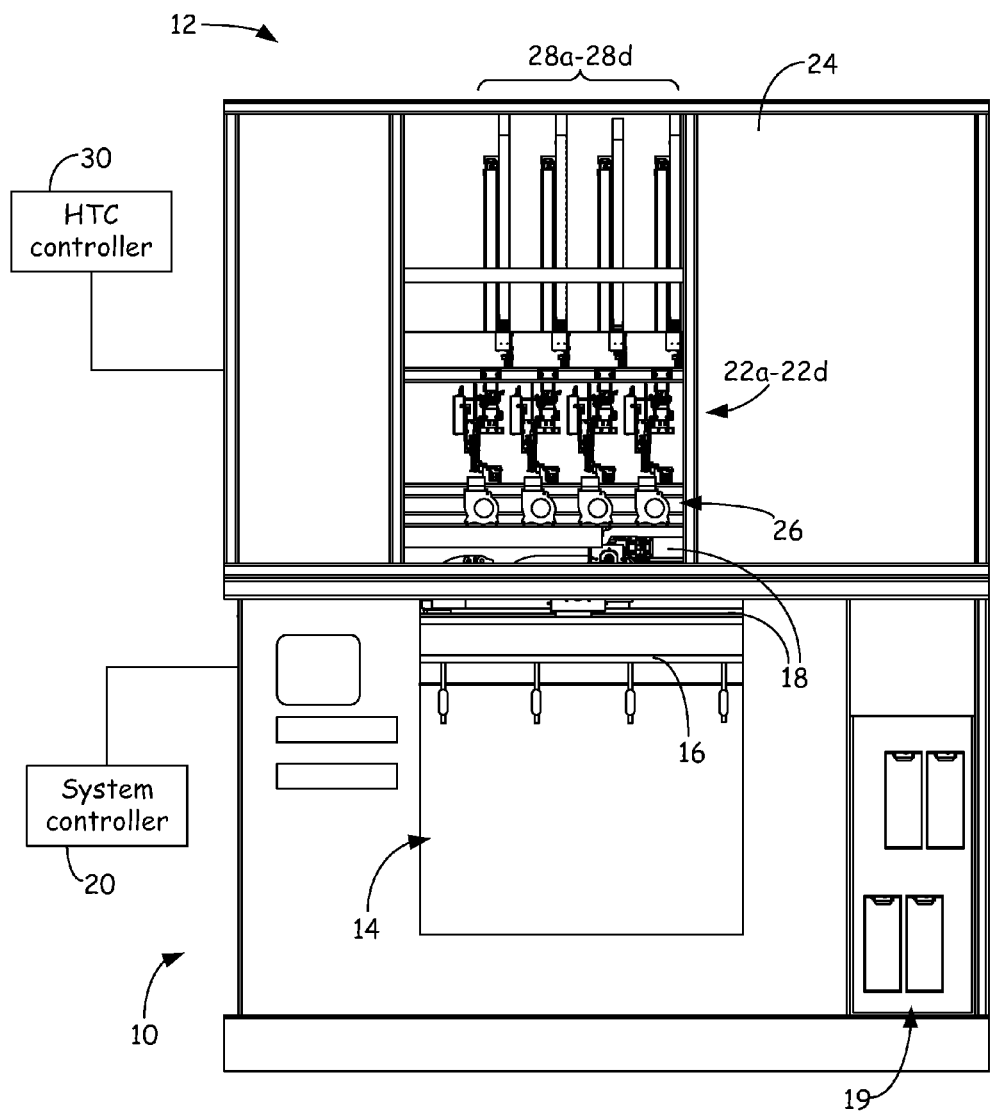
FIG. 1 is a front view of a deposition-based digital manufacturing system in use with a head tool changer of the present disclosure.

FIG. 1 is a front view of system 10 in use with head tool changer 12, where system 10 is a deposition-based digital manufacturing system and head tool changer 12 is an example of a suitable head tool changer of the present disclosure. Suitable deposition-based digital manufacturing systems for system 10 include extrusion-based systems and/or jetting systems, each of which may build 3D models and corresponding support structures using a layered-based additive technique. Suitable extrusion-based systems for system 10 include fused deposition modeling systems developed by Stratasys, Inc., Eden Prairie, Minn., such as those disclosed in Comb et al., U.S. Pat. No. 5,939,008; Swanson et al., U.S. Pat. Nos. 6,722,872 and 6,776,602; and Comb et al., U.S. patent application Ser. Nos. 12/255,289 and 12/255,330; and those commercially available under the trade designation "FORTUS" from Stratasys, Inc., Eden Prairie, Minn.

System 10 includes build chamber 14, platform assembly 16, and gantry 18, and bays 19a-19d, where build chamber 14 is an enclosed environment that contains platform assembly 16 and a portion of gantry 18. During a build operation, build chamber 14 is desirably heated to reduce the rate at which the modeling and support materials solidify after being extruded and deposited.

Platform assembly 16 is a receiving platform on which a 3D model and corresponding support structure (not shown) are built, and desirably moves along a vertical z-axis based on signals provided from system controller 20. Examples of suitable platforms for platform assembly 16 include those disclosed in Comb et al., U.S. patent application Ser. No. 12/255,330. System controller 20 is one or more computer-operated controllers for operating system 10, and may be located internally or externally to system 10.

Gantry 18 is a guide rail system that is desirably configured to move a deposition head of multiple interchangeable deposition heads 22a-22d in a horizontal x-y plane within build chamber 14 based on signals provided from system controller 20. The horizontal x-y plane is a plane defined by an x-axis and a y-axis, where the x-axis, the y-axis, and the z-axis are orthogonal to each other. In an alternative embodiment, platform assembly 16 may be configured to move along two axes within build chamber 14 (e.g., x-z plane or the y-z plane), and the loaded deposition head may be configured to move along a single horizontal axis (e.g., the x-axis or the y-axis). Other similar arrangements may also be used such that one or both of platform assembly 16 and the loaded deposition head are moveable relative to each other.

In the shown embodiment, gantry 18 is configured to retain a single deposition head. As such, head tool changer 12 may only load one of deposition heads 22a-22d to gantry 18 at any given time. Of course, when system 10 is not operating, all four deposition heads 22a-22d can be removed from gantry 18. In alternative embodiments, gantry 18 may be configured to retain multiple deposition heads, such as disclosed in Swanson et al., U.S. patent application Ser. No. 12/180,140.

Suitable deposition heads for deposition heads 22a-22d may include a variety of different deposition-based devices, such as extrusion heads, jetting heads, and combinations thereof. Examples of suitable extrusion heads for each of deposition heads 22a-22d include those disclosed in LaBossiere, et al., U.S. Patent Application Publication Nos. 2007/0003656 and 2007/00228590; and Leavitt, U.S. Patent Application Publication No. 2009/0035405. Alternatively, deposition heads 22a-22d may each include one or more two-stage pump assemblies, such as those disclosed in Batchelder et al., U.S. Pat. No. 5,764,521; and Skubic et al., U.S. Patent Application Publication No. 2008/0213419. As discussed below, however, because head tool changer 12 allows deposition heads 22a-22d to be interchangeably loaded to gantry 18, deposition heads 22a-22d each desirably only includes a single deposition line (e.g., a single extrusion line) rather than a pair of deposition lines that are toggled back and forth between active and non-active states.

Deposition heads 22a-22d desirably receive consumable materials (e.g., modeling and support materials) from one or more supply sources (not shown) loaded to bays 19. In some embodiments, the consumable materials may be provided to system 10 as filaments. In these embodiments, suitable supply sources include spools and/or spooled containers, such as those disclosed in Swanson et al., U.S. Pat. No. 6,923,634; Comb et al., U.S. Pat. No. 7,122,246; and Taatjes et al, U.S. patent application Ser. Nos. 12/255,808 and 12/255,811. Deposition heads 22a-22d may each also receive consumable materials from two or more spools or spooled containers loaded into bays 19 to provide for a continuous operation, as disclosed in Swanson et al., U.S. Pat. No. 6,923,634.

In the shown embodiment, head tool changer 12 is secured to a top section of system 10, and includes housing 24, tool rest assembly 26, and actuator assemblies 28a-28d. Housing 24 is an exterior housing for protecting the components of head tool changer 12. In one embodiment, housing 24 may encase tool rest assembly 26 and actuator assemblies 28a-28d, and may include a service door (not shown) to allow an operator of system 10 to access components retained within housing 24 (e.g., deposition heads 22a-22d). Tool rest assembly 26 is a component that allows one or more of deposition heads 22a-22d to be initialized (e.g., warmed up and purged) prior to use. Actuator assemblies 28a-28d are extendable components that are configured to load deposition heads 22a-22d to gantry 18 in an interchangeable manner based on signals provided from head tool changer (HTC) controller 30.

HTC controller 30 is also one or more computer-operated controllers for operating head tool changer 12, and may be located internally or externally to system 10 and/or head tool changer 12. In one embodiment, the functions of system controller 20 and HTC controller 30 may be combined into a common computer-operated controller that may be located internally or externally to system 10 and/or head tool changer 12. Tool rest assembly 26 and actuator assemblies 28a-28d are discussed in more detail below.

The following discussion of head tool changer 12 illustrates the use of four interchangeable deposition heads (i.e., deposition heads 22a-22d). However, head tool changer 12 may be configured to load additional or fewer numbers of deposition heads to gantry 18. Examples of suitable numbers of deposition heads for use with head tool changer 12 range from two to ten, with particularly suitable numbers ranging from three to six.

Figure 2A:
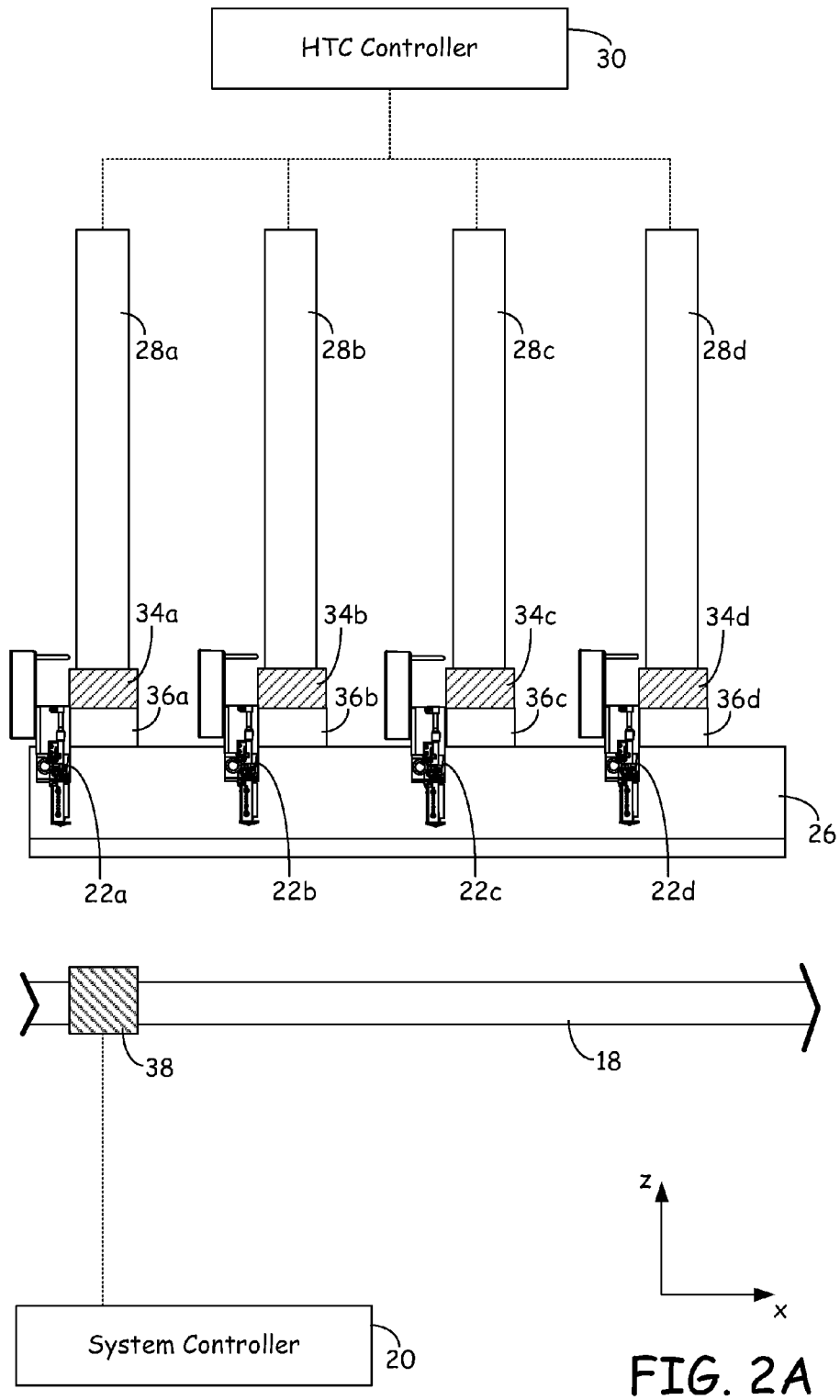
FIGS. 2A-2P are schematic illustrations of a process for interchangeably loading deposition heads to a gantry of the digital manufacturing system with the use of the head tool changer.
Figure 2B:
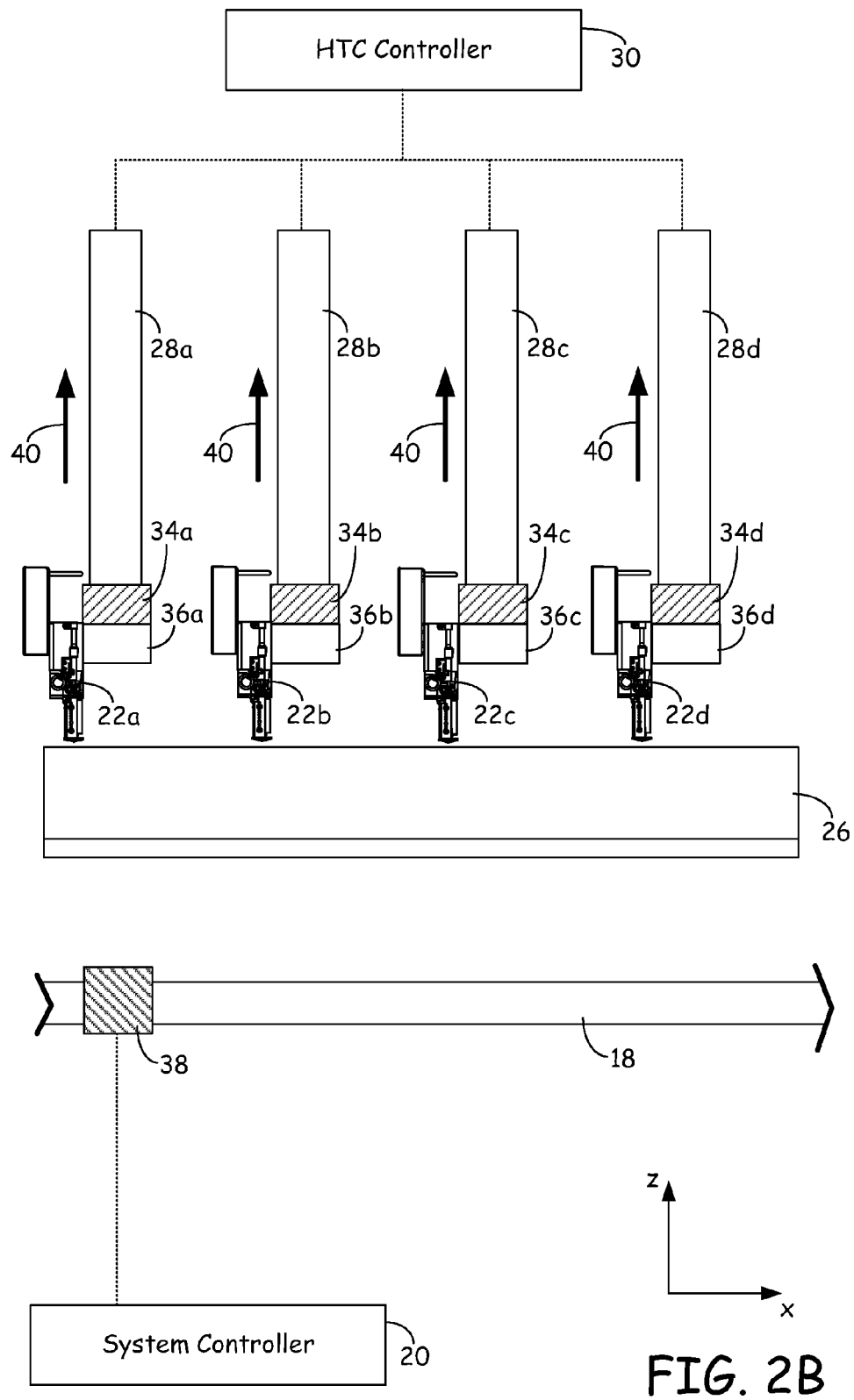
Figure 2C:
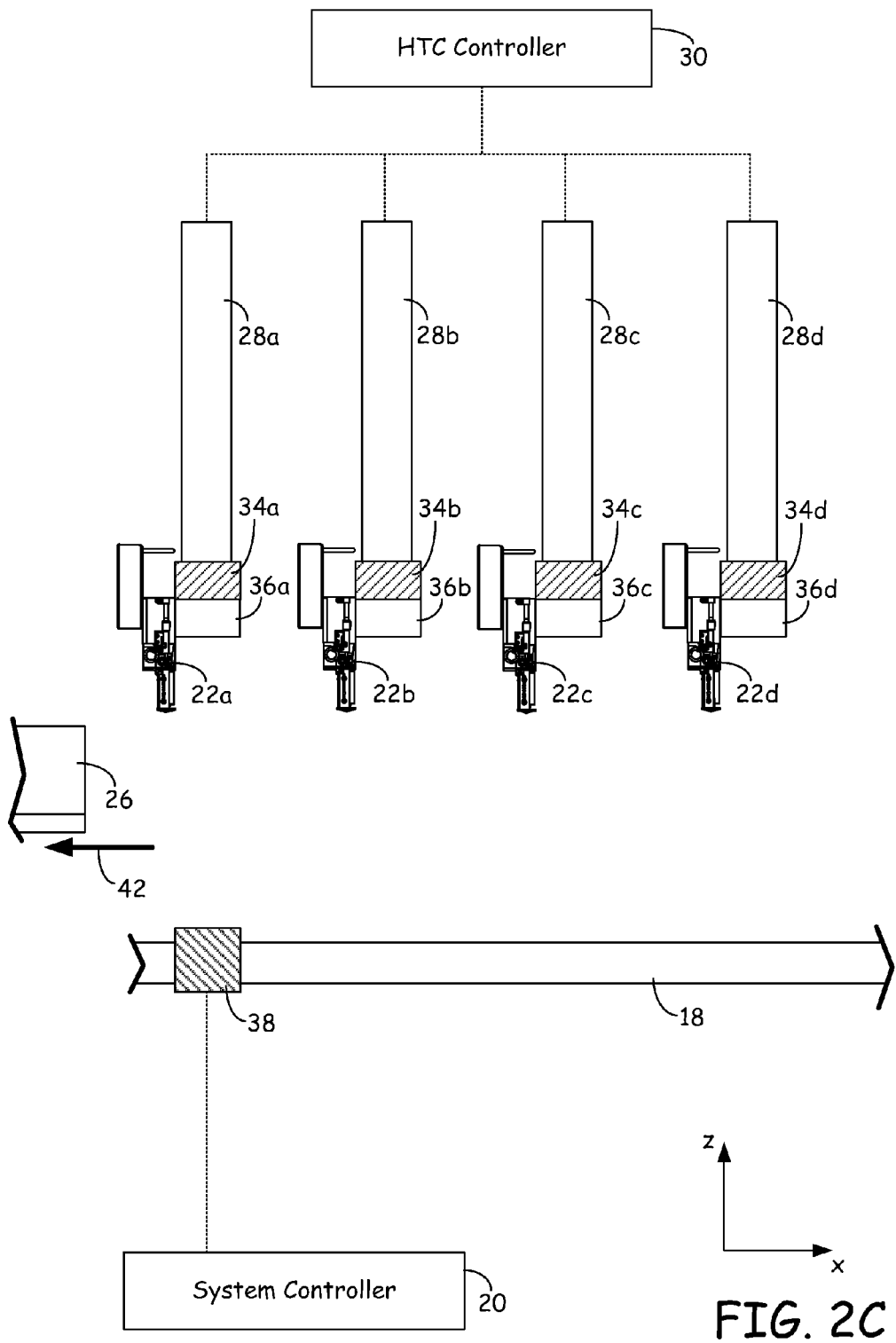
Figure 2D:
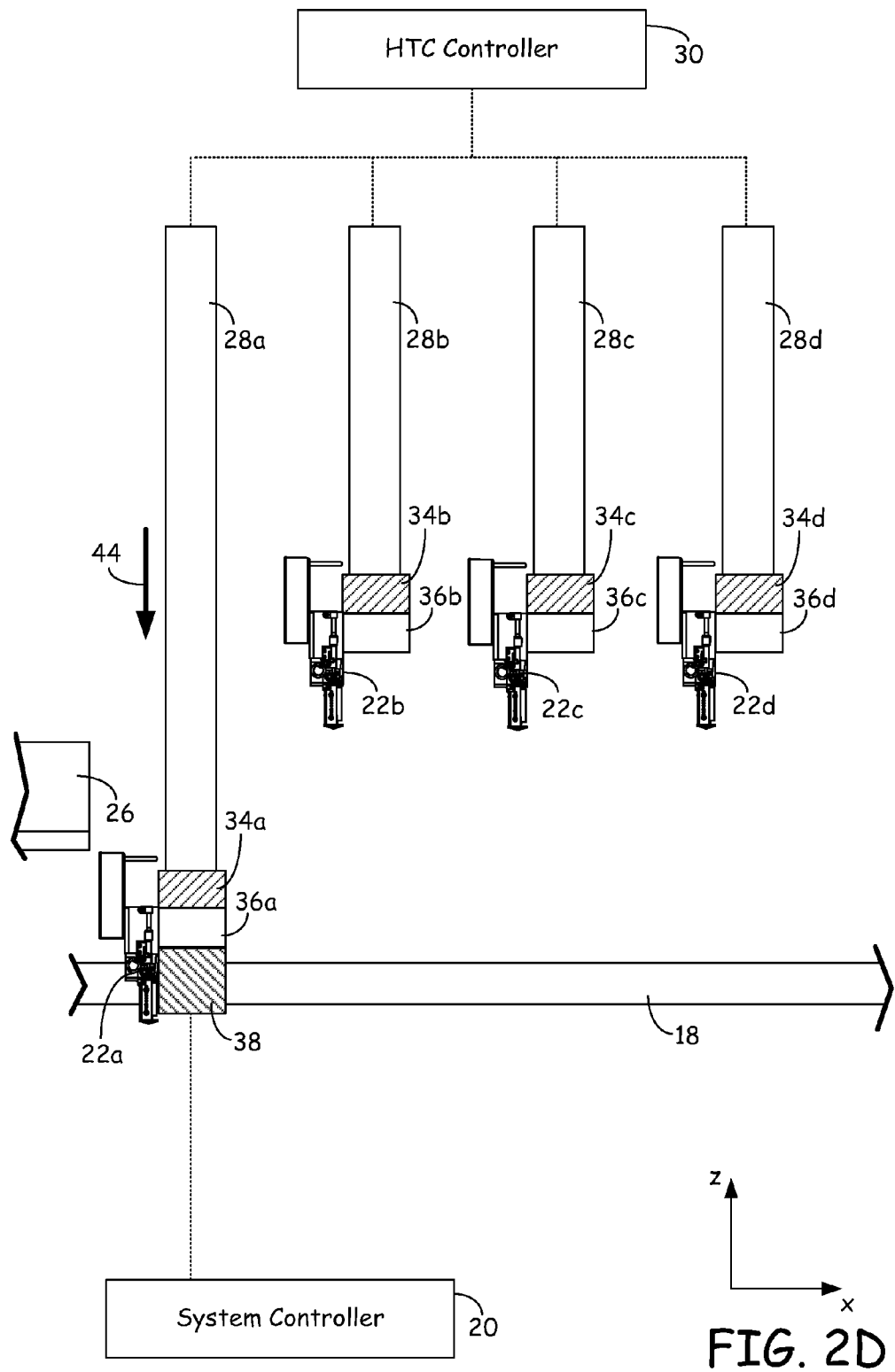
Figure 2E:
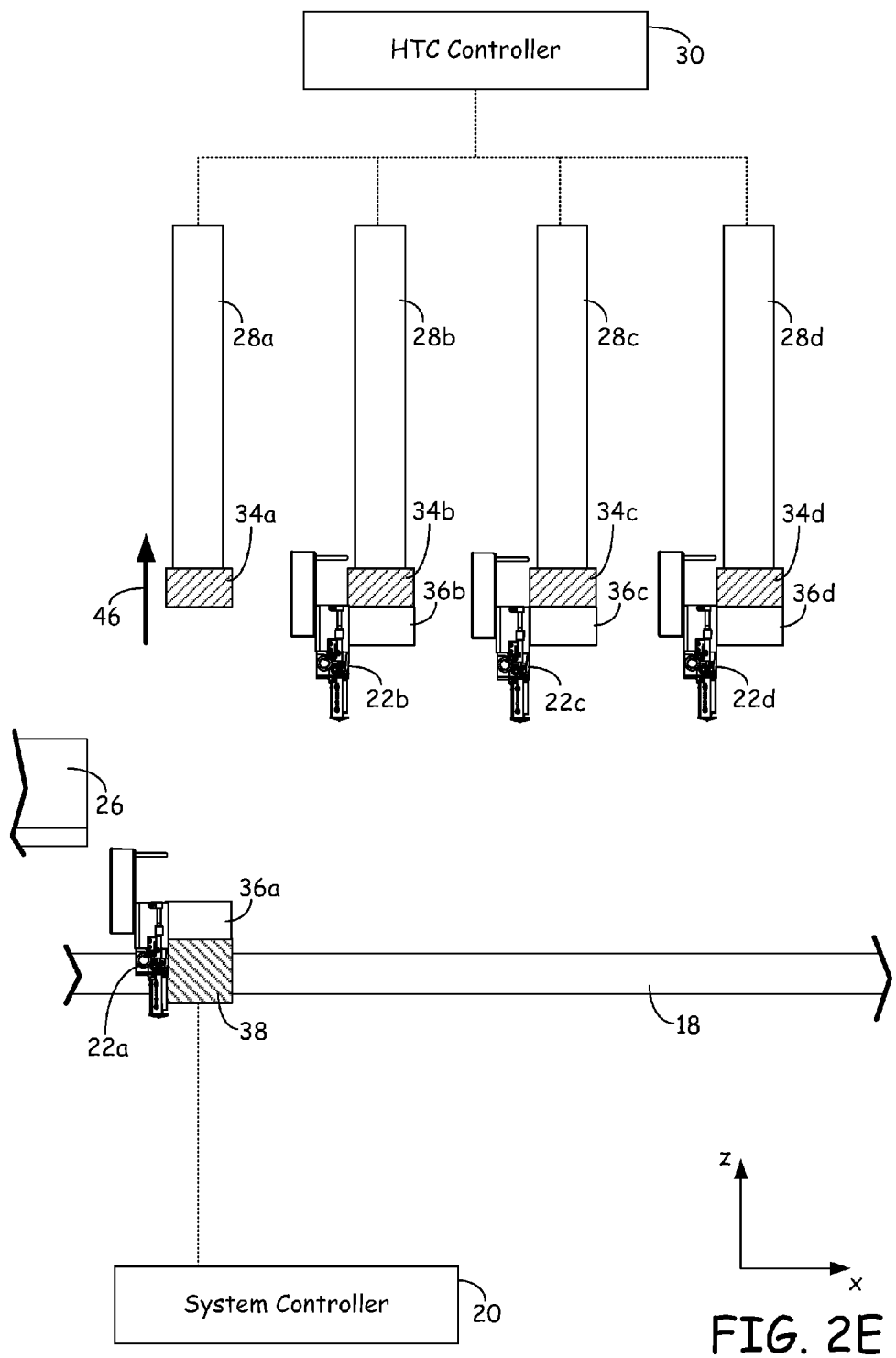
Figure 2F:
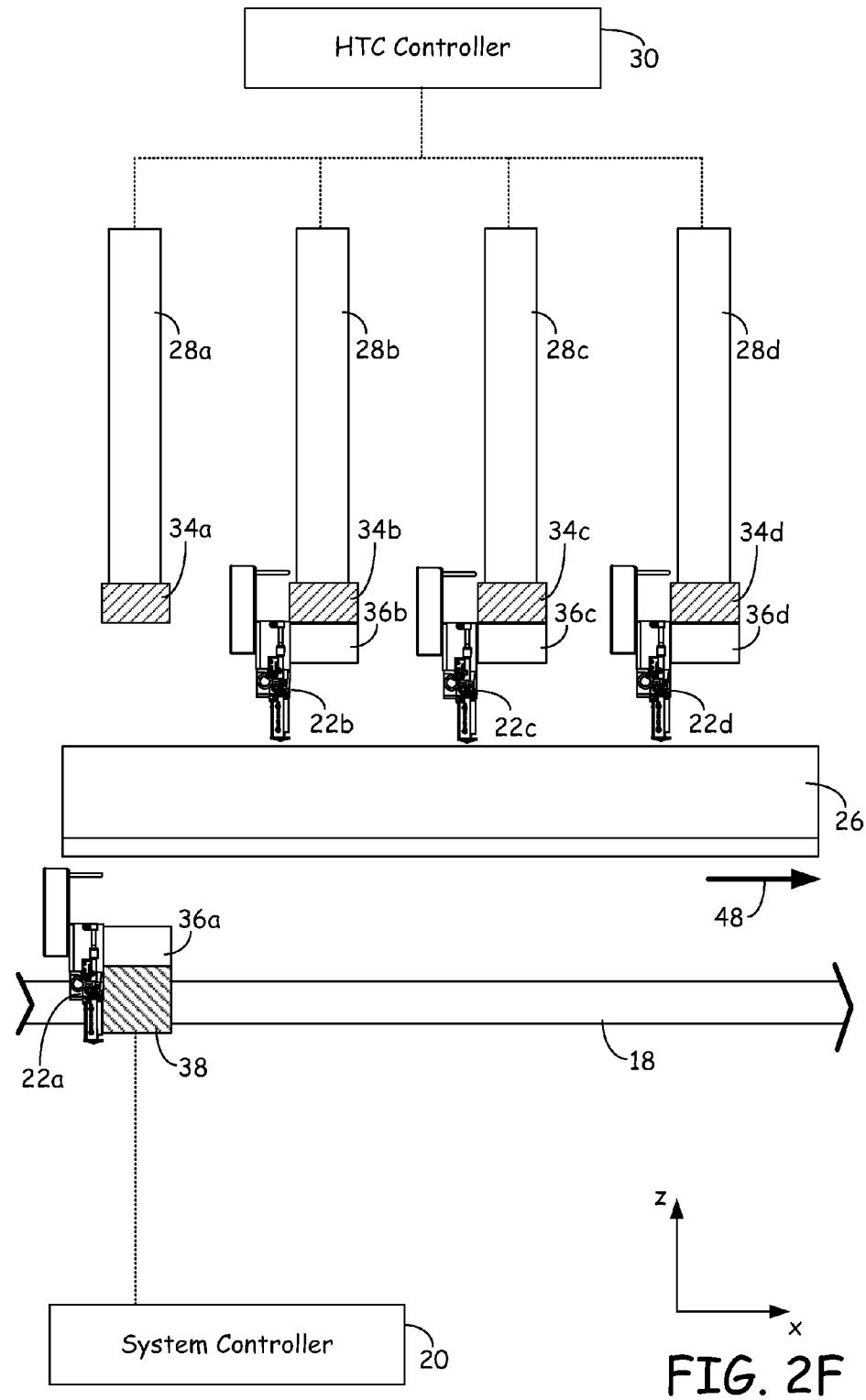
Figure 2G:
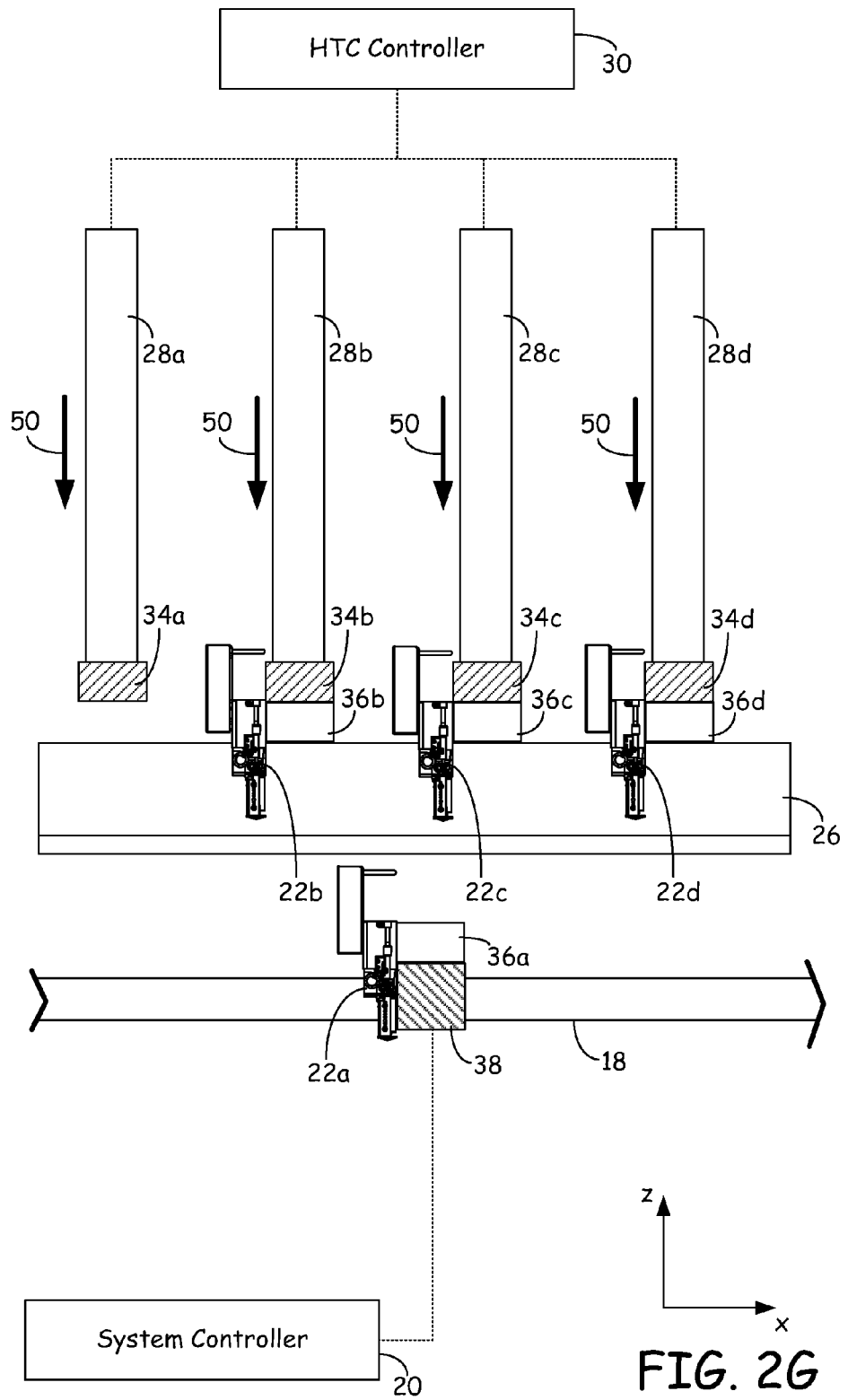
Figure 2H:
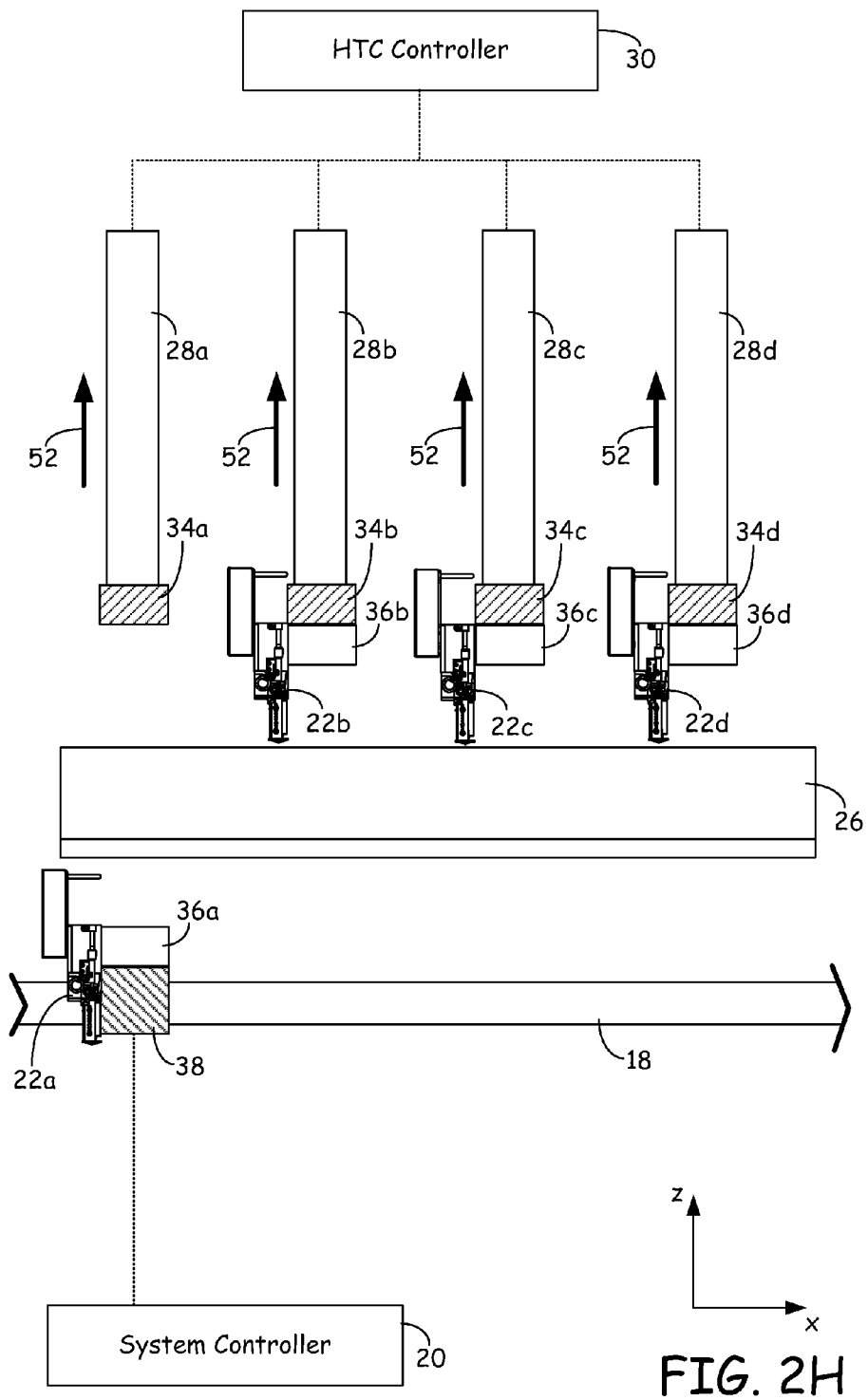
Figure 2I:
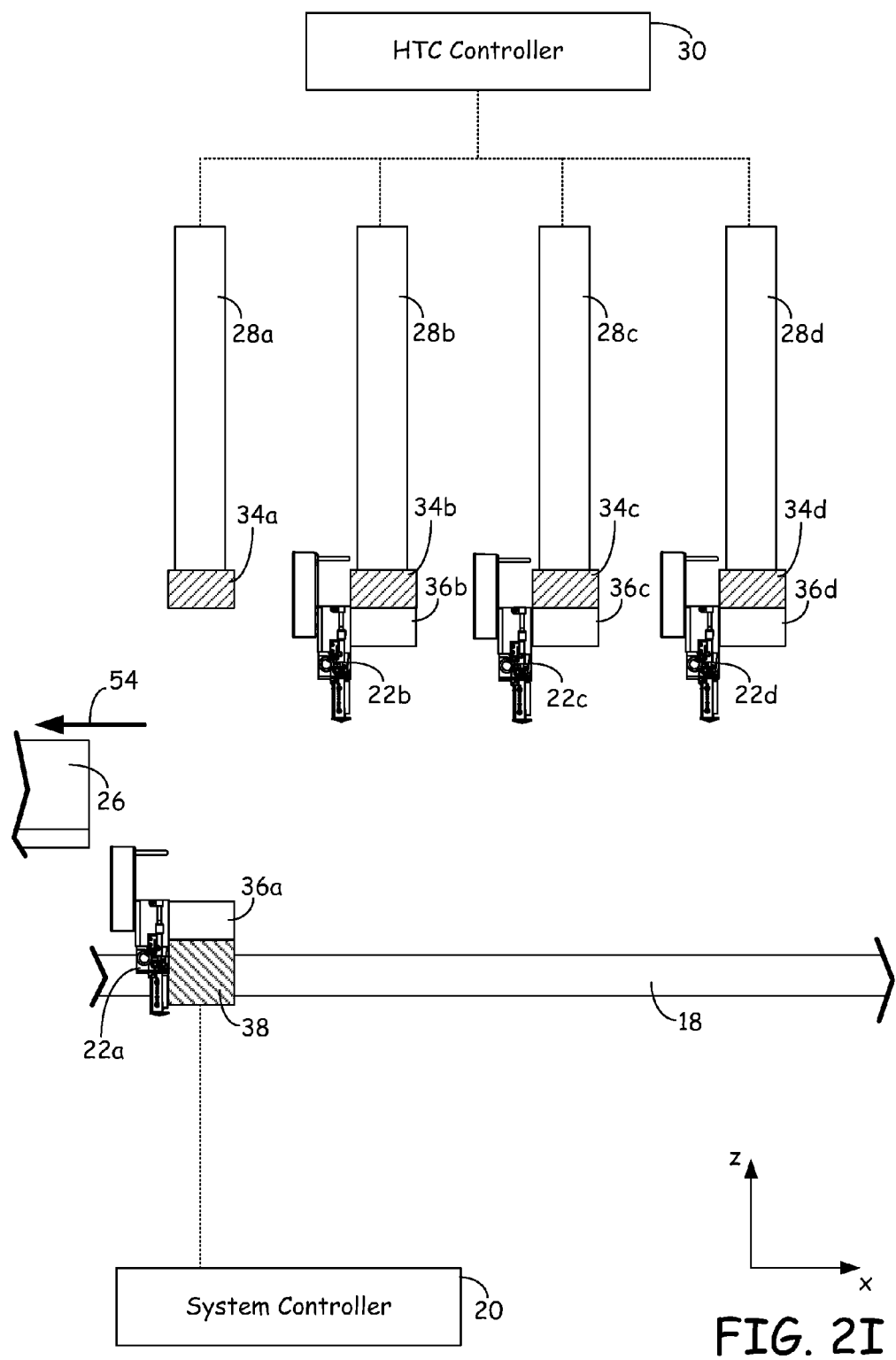
Figure 2J:
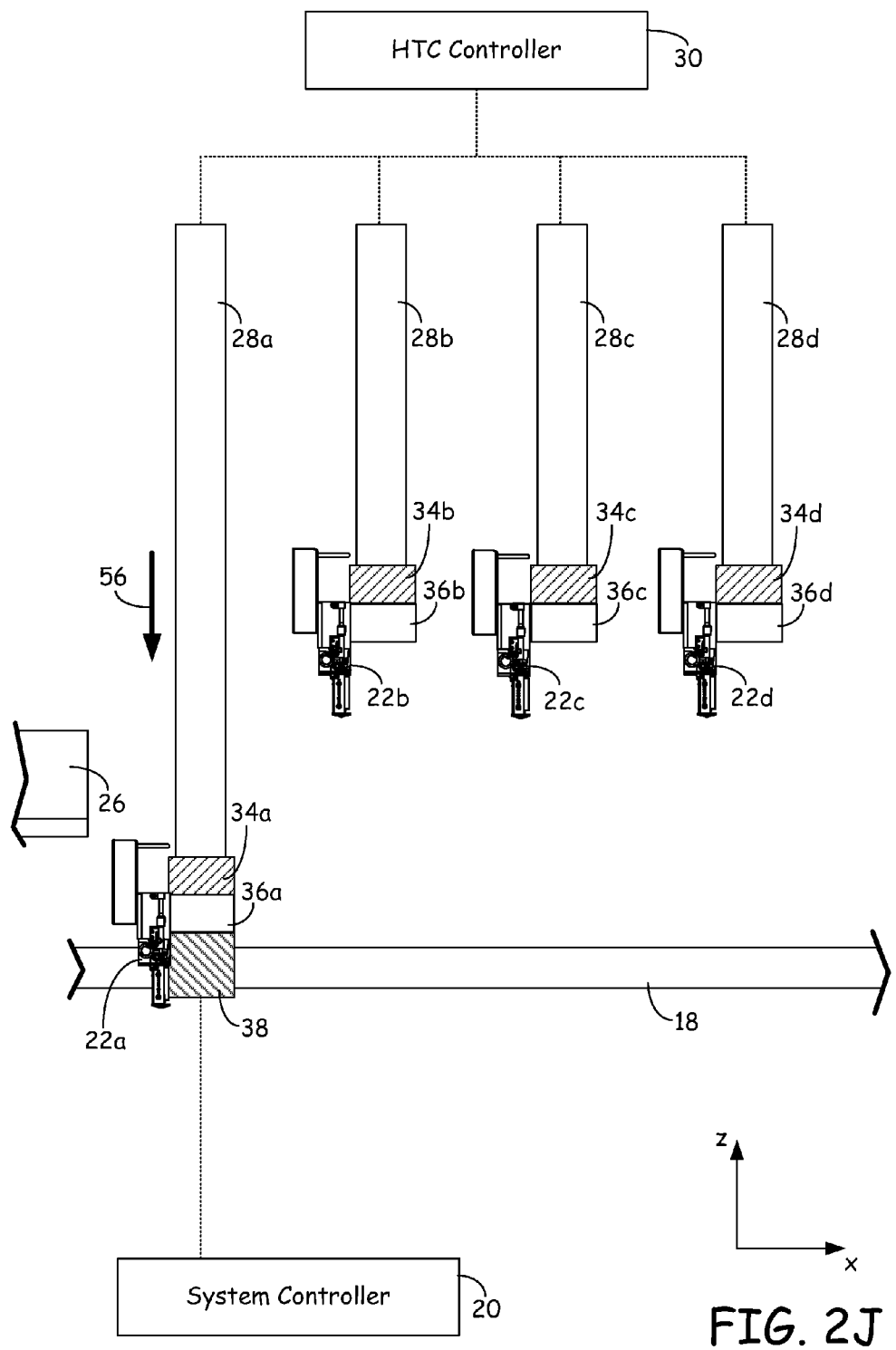
Figure 2K:
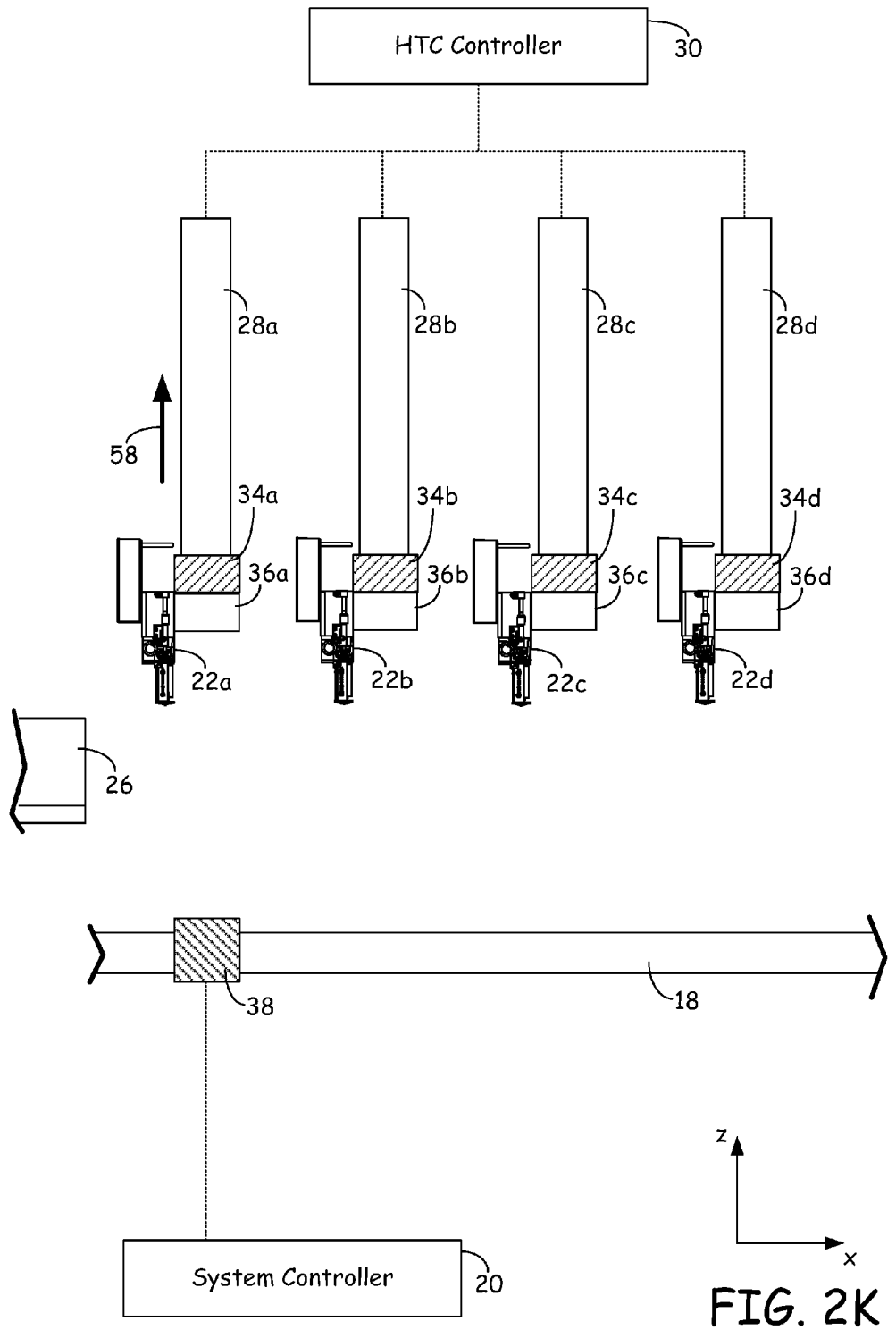
Figure 2L:
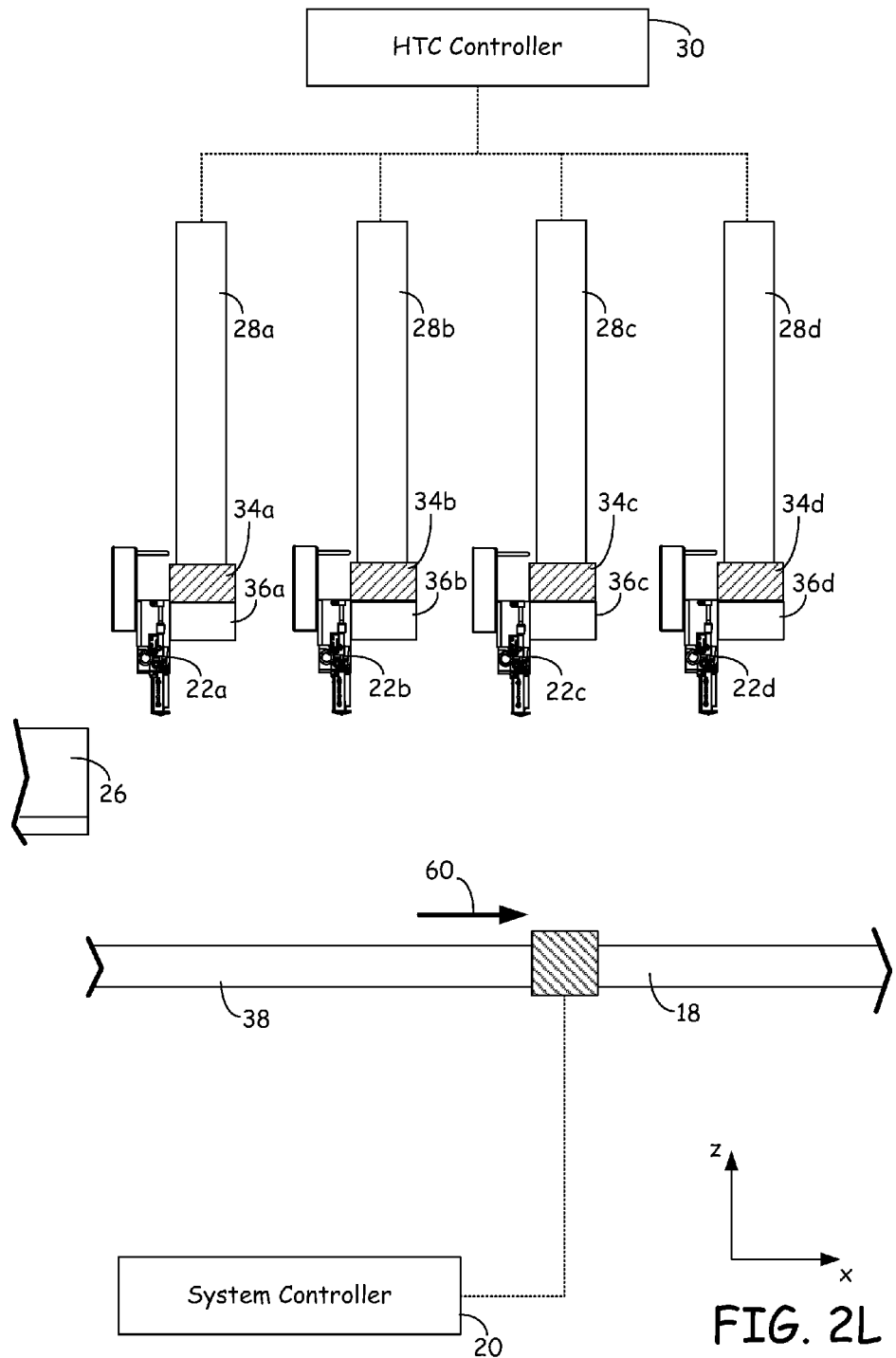
Figure 2M:
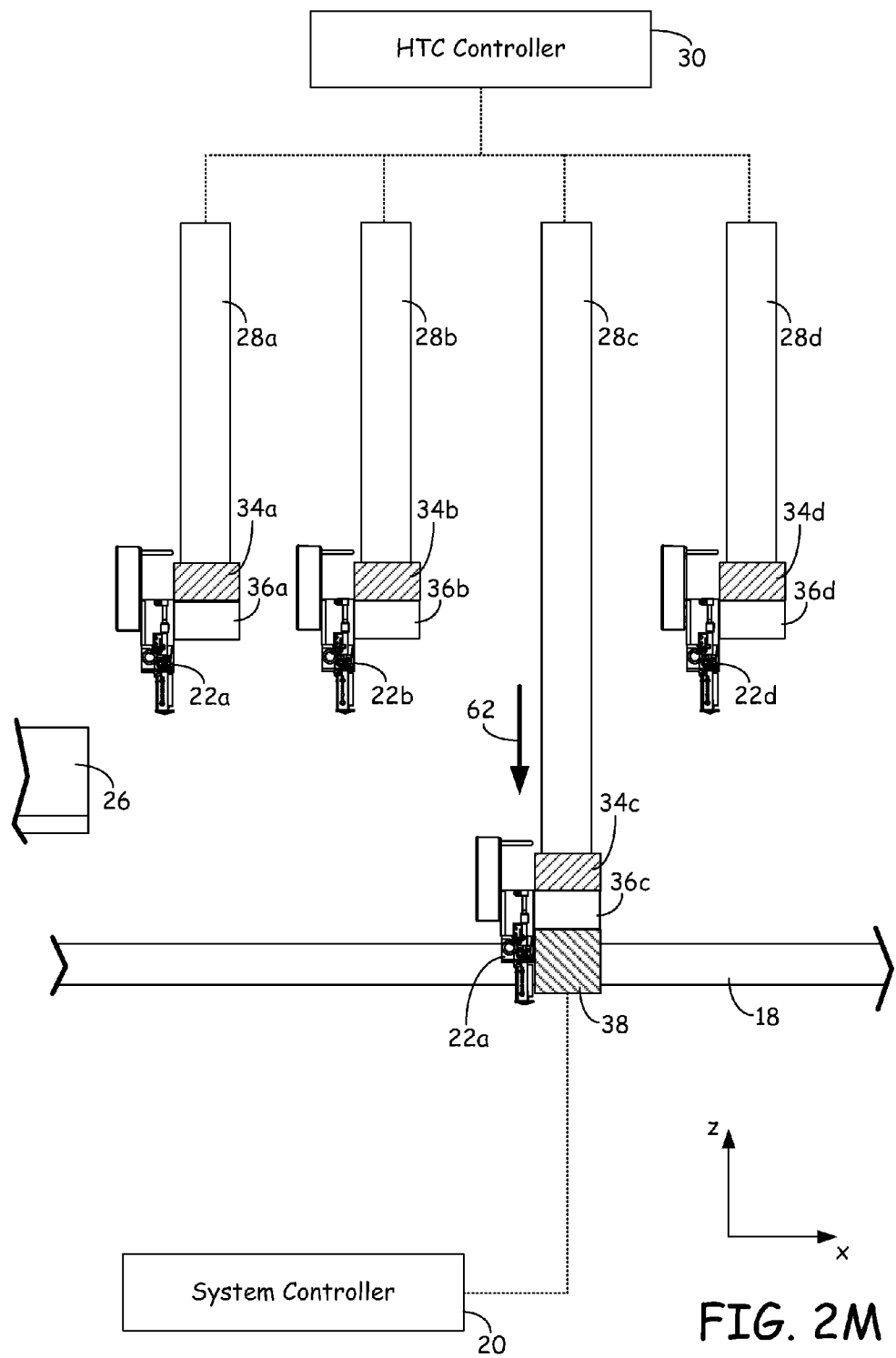
Figure 2N:
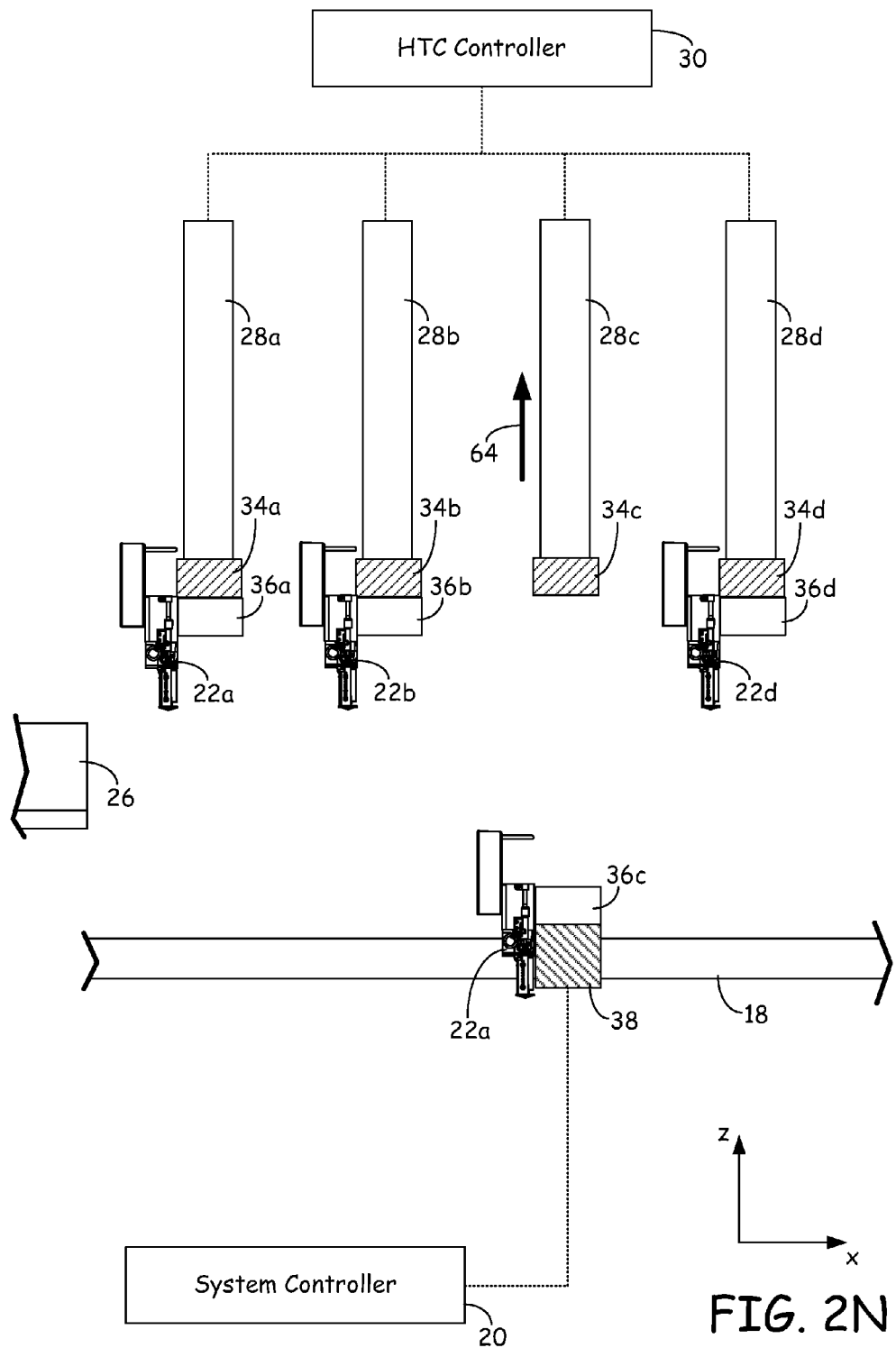
Figure 20:
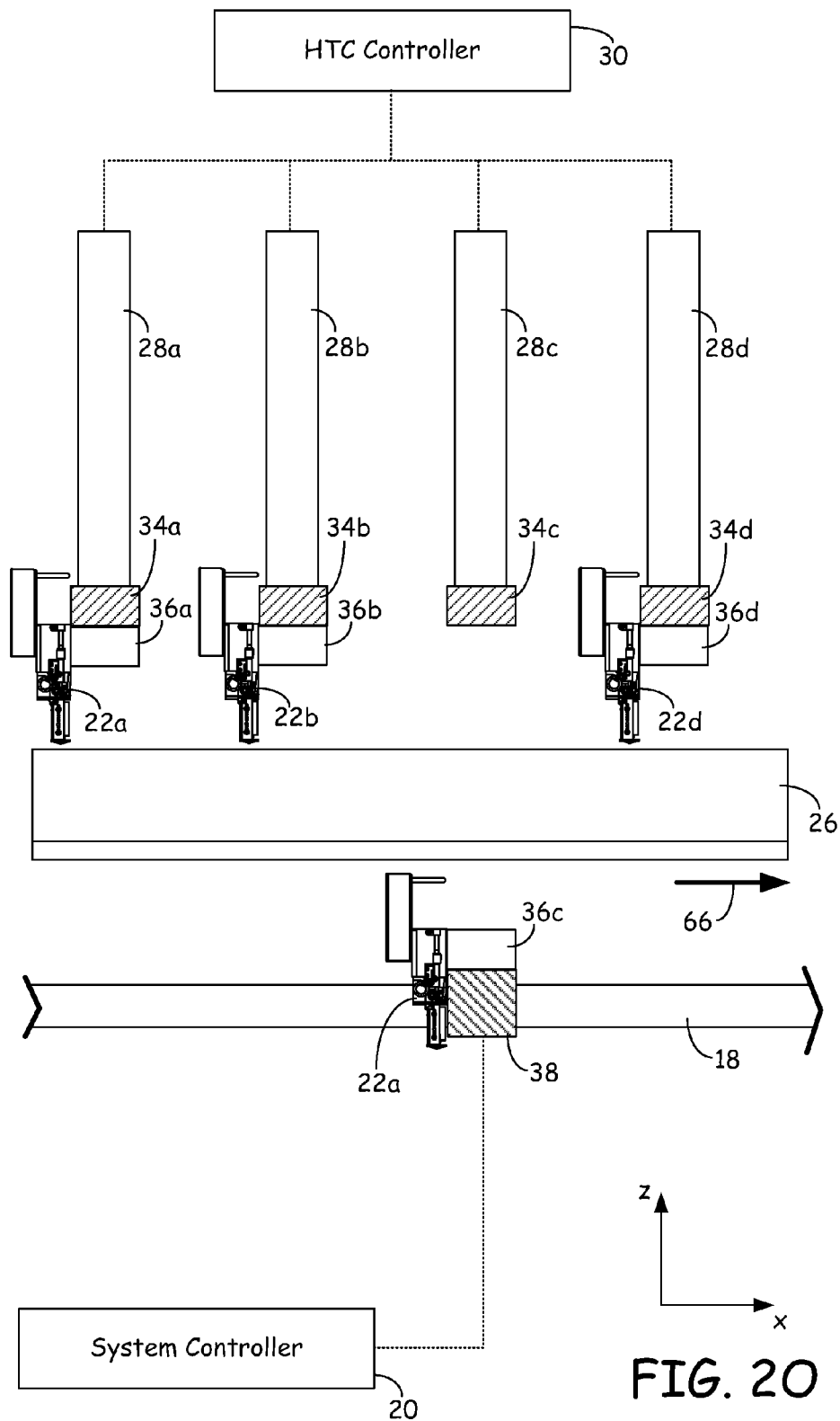
Figure 2P:
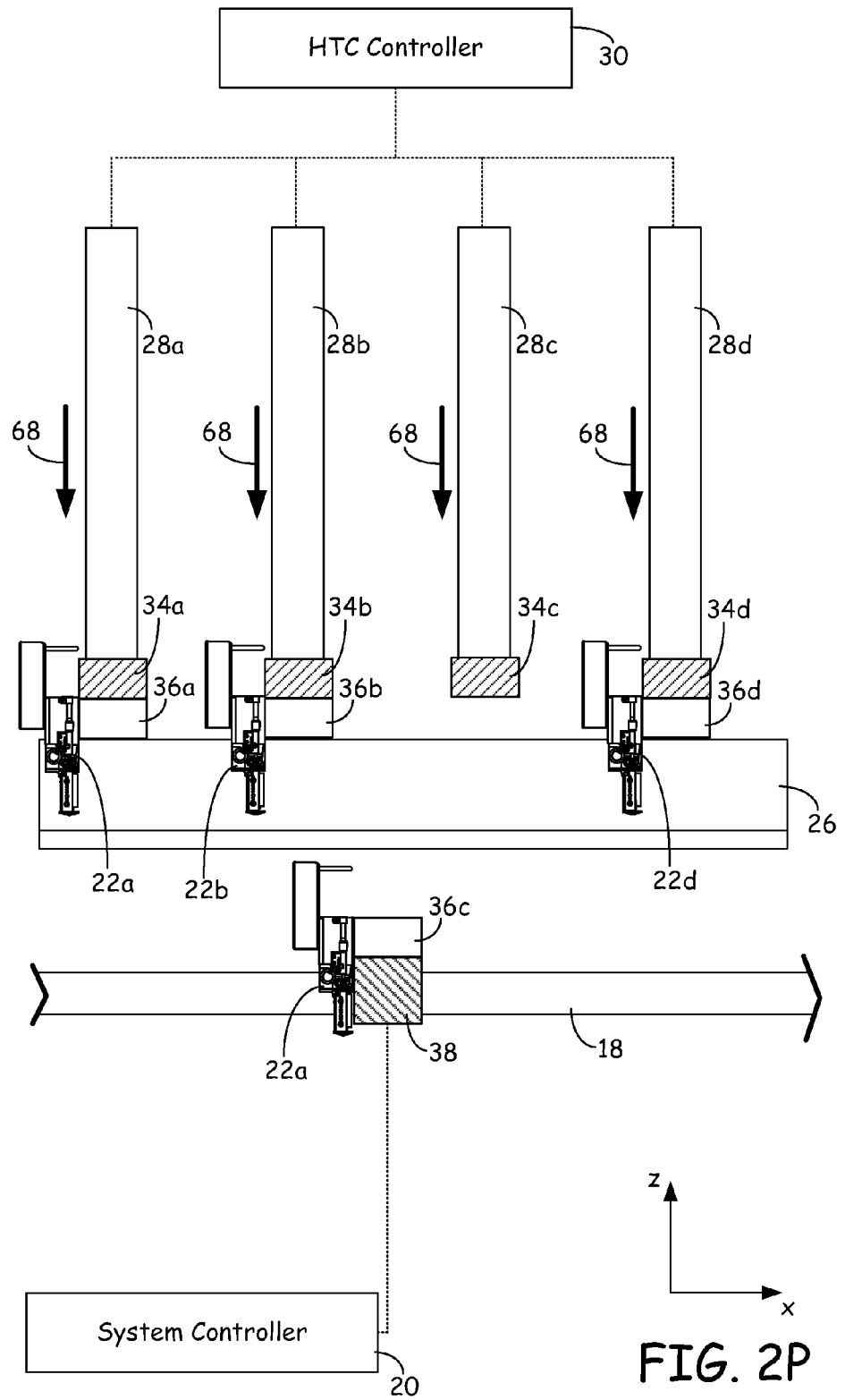
Figure 3:
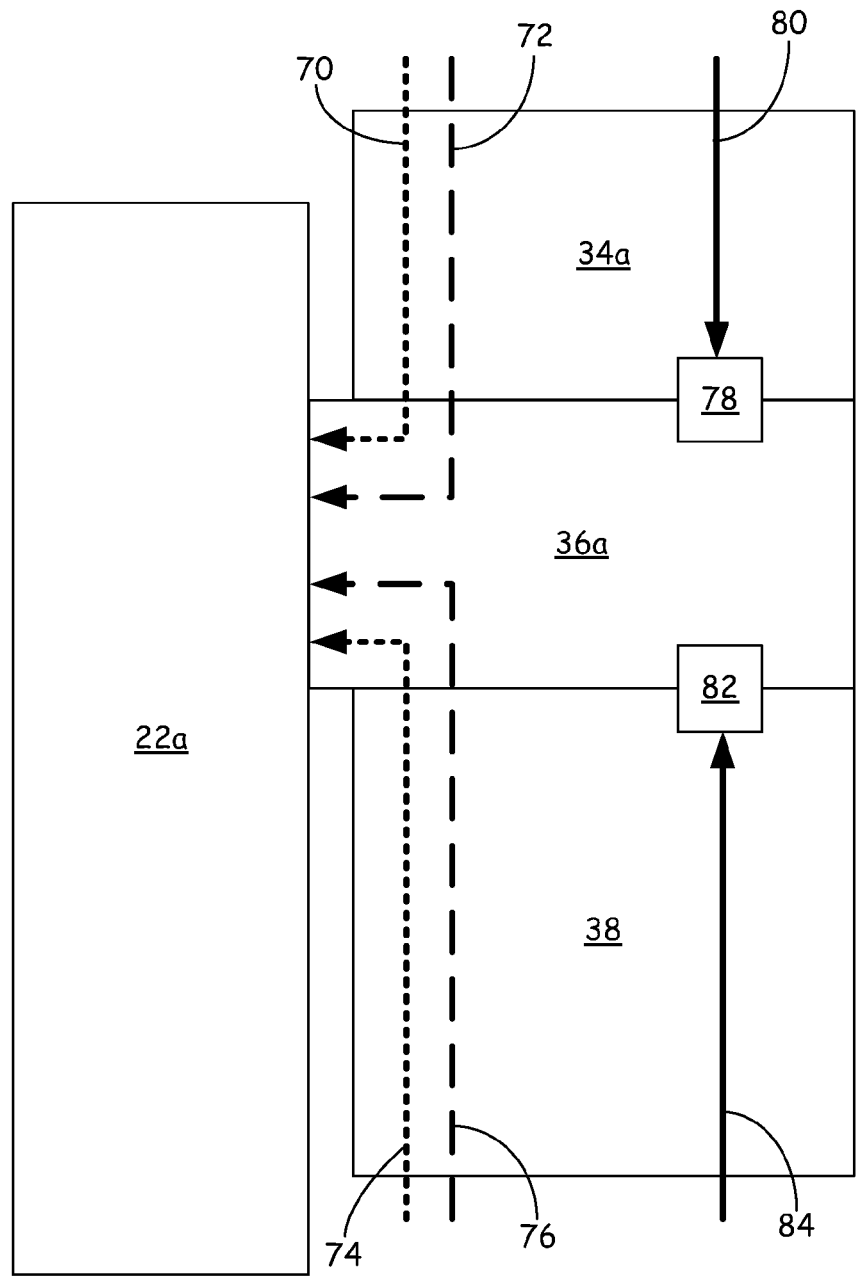
FIG. 3 is a schematic illustration of the engagements between a grip unit, a tooling unit, and a master unit of the head tool changer.

FIGS. 2A-2P and 3 are schematic illustrations of a process for interchangeably loading deposition heads 22a-22d to gantry 18 of system 10 with the use the head tool changer 12. FIGS. 4-13 subsequently illustrate suitable features of the components described in FIGS. 2A-2P and 3, pursuant to one embodiment of the present disclosure. As shown in FIG. 2A, head tool assembly 12 also includes grip units 34a-34d, tooling units 36a-36d, and master unit 38. Grip units 34a-34d are respectively secured to actuator assemblies 28a-28d and are configured to engage with and lock to tooling units 36a-36d. Tooling units 36a-36d are respectively secured to deposition heads 22a-22d and are configured to engage with and lock to grip units 34a-34d and master unit 38. Master unit 38 is secured to gantry 18 (e.g., in a carriage of gantry 18) and is configured to interchangeably engage tooling units 36a-36d. Accordingly, gantry 18 is configured to move master unit 38 around in the horizontal x-y plane.

As discussed below, grip units 34a-34d are configured to relay electrical power and control signals from HTC controller 30 to tooling units 36a-36d when tooling units 36a-36d are respectively engaged with grip units 34a-34d. Similarly, master unit 38 is configured to relay electrical power and control signals from system controller 20 to one of tooling units 36a-36d when the given tooling unit is engaged with master unit 38. Tooling units 36a-36d are also configured to relay the received electrical power and control signals respectively to deposition heads 22a-22d. As such, when tooling units 36a-36d are engaged with grip units 34a-34d, deposition heads 22a-22d receive electrical power and control signals from HTC controller 30. Alternatively, when one of tooling units 36a-36d is engaged with master unit 38, the corresponding deposition head receives electrical power and control signals from system controller 20.

In the example shown in FIG. 2A, grip units 34a-34d are respectively engaged with and locked to tooling units 36a-36d, thereby allowing deposition heads 22a-22d to be operably retained by actuator assemblies 28a-28d. As such, deposition heads 22a-22d receive electrical power and control signals from HTC controller 30 via actuator assemblies 28a-28d, grip units 34a-34d, and tooling units 36a-36d.

Actuator assemblies 28a-28d are each configured to retract and extend along the vertical z-axis between a raised position and one or more lowered positions. In particular, as shown in FIG. 2A, actuator assemblies 28a-28d may extend to a resting position such that tooling plates 36a-36d rest on tool rest assembly 26. As discussed above, tool rest assembly 26 is a component on which idle deposition heads 22a-22d may rest when not loaded to gantry 18, and may be used for initializing (e.g., warming up and purging) one or more of deposition heads 22a-22d for use in system 10.

Prior to building a 3D model or support structure, HTC controller 30 may initialize (e.g., warm up and purge) one or more of deposition heads 22a-22d for use in system 10. For example, HTC controller 30 may direct head tool changer 12 may to initialize deposition head 22a at tool rest assembly 26. When deposition head 22a is ready for use, system controller 20 may align gantry 18 such that master unit 38 is positioned below actuator assembly 28a in the horizontal x-y plane to receive deposition head 22a, as shown in FIG. 2A.

As shown in FIG. 2B, HTC controller 30 may then retract actuator assemblies 28a-28d upward to their raised positions, as indicated by arrows 40. This desirably positions depositions heads 22a-22d vertically higher than tool rest assembly 26. As shown in FIG. 2C, HTC controller 30 may then direct tool rest assembly 26 to slide along the x-axis in the direction of arrow 42 to avoid obstructing actuator assemblies 28a-28d.

As shown in FIG. 2D, HTC controller 30 may then extend actuator assembly 28a downward to an engagement position such that tooling unit 36a engages master unit 38, as indicated by arrow 44. At this point, tooling unit 36a may unlock from grip unit 34a and lock to master unit 38. Additionally, control of deposition head 22a may transfer from head tool changer 12 and HTC controller 30 to system 10 and system controller 20. In particular, deposition head 22a may receive electrical power and control signals from system controller 20 respectively via master unit 38 and tooling unit 36a, and the electrical power and control signals relayed through actuator assembly 28a, grip unit 34a, and tooling unit 36a may be cut off.

As shown in FIG. 2E, HTC controller 30 may then retract actuator assembly 28a to its raised position, as indicated by arrow 46. This correspondingly disengages grip unit 34a from tooling unit 36a, and raises grip unit 34a upward into head tool changer 12. As shown in FIG. 2F, HTC controller 30 may then direct tool rest assembly 26 to slide back along the x-axis to extend below actuator assemblies 28a-28d, as indicated by arrow 48.

As shown in FIG. 2G, HTC controller 30 may then direct actuator assemblies 28a-28d to extend to their resting positions such that tooling units 36b-36d rest on tool rest assembly 26, as indicated by arrows 50. At this point, system controller 20 may also direct gantry 18 to move deposition head 22a (and tooling unit 36a and master unit 38) around in the horizontal x-y plane within build chamber 14 (shown in FIG. 1), and may direct one or more feed mechanisms (not shown) to feed a consumable material through deposition head 22a. The received consumable material is then deposited onto platform assembly 16 (shown in FIG. 1) to build at least a portion of a 3D model or support structure using a layer-based additive technique. After each layer is complete, platform assembly 16 may be lowered by an increment along the z-axis to allow successive layers to be formed on top of the previously deposited layers.

While deposition head 22a is functioning as the active deposition head, HTC controller 30 may also direct one or more of deposition heads 22b-22d to be initialized for use in system 10. This allows the initializations of the deposition heads 22b-22d to be performed at the same time as deposition head 22a is in use in system 10. For example, HTC controller 30 may initialize deposition head 22c for operation after active deposition head 22a has completed its deposition steps. The timing sequence for initializing deposition head 22c desirably has deposition head 22c ready for use as soon as deposition head 22a completes its deposition steps.

In comparison, a deposition head that contains two deposition lines (e.g., extrusion lines), such as the deposition head disclosed in Leavitt, U.S. Patent Application Publication No. 2009/0035405, typically requires the non-active deposition line to be warmed up and purged between deposition steps. Otherwise, the non-active deposition line may interfere with the deposition from the active deposition line (e.g., material may potentially leak from the non-active deposition line). These the warm up and purge processes between the deposition steps, however, accumulate over the numerous layers used to build 3D models and support structures, This can account for a substantial portion of the overall build time.

Initializing deposition heads 22b-22d in tandem with the operation of deposition head 22a, however, effectively removes the delays incurred with warming up and purging non-active deposition lines, thereby substantially reducing the overall build time.

In addition, an operator of system 10 may inspect, repair, or otherwise perform work on deposition heads 22b-22d while deposition head 22a continues to build the 3D model or support structure. As such, in addition to initializing the non-active deposition heads (e.g., deposition heads 22b-22d) in tandem with the operation of the active deposition head (e.g., deposition head 22a), the non-active deposition heads may also be maintained while inactive, thereby reducing maintenance delays that may otherwise occur during operation.

As shown in FIG. 2H, after deposition head 22a completes its deposition steps, system controller 20 may direct gantry 18 to position tooling unit 36a and master plate 38 below actuator assembly 28a in the horizontal x-y plane. HTC controller 30 may also retract actuator assemblies 28a-28d upward to their raised positions, as indicated by arrows 52. As discussed above, this desirably positions depositions heads 22b-22d vertically higher than tool rest assembly 26. As shown in FIG. 2I, HTC controller 30 may then direct tool rest assembly 26 to slide along the x-axis in the direction of arrow 54 to again avoid obstructing actuator assemblies 28a-28d.

As shown in FIG. 2J, HTC controller 30 may then extend actuator assembly 28a downward to its engagement position, thereby allowing grip unit 34a to engage with and lock to tooling unit 36a, as indicated by arrow 56. At this point, tooling unit 36a may unlock from master unit 38 and lock to grip unit 34a. Additionally, control of deposition head 22a may now transfer from system 10 and system controller 20 back to head tool changer 12 and HTC controller 30. In particular, deposition head 22a may receive electrical power and control signals from HTC controller 30 via actuator assembly 28a, grip unit 34a, and tooling unit 36a, and the electrical power and control signals relayed through master unit 38 and tooling unit 36a may be cut off.

As shown in FIG. 2K, HTC controller 30 may then retract actuator assembly 28a to its raised position, as indicated by arrow 58. This correspondingly disengages tooling unit 36a from master unit 38, and raises grip unit 34a, tooling unit 36a, and deposition head 22a upward into head tool changer 12. As shown in FIG. 2L, system controller 20 may then direct gantry 18 to move master unit 38 to position it below the next actuator assembly to be used (e.g., actuator assembly 28c) in the horizontal x-y plane, as indicated by arrow 60.

As shown in FIG. 2M, HTC controller 30 may then extend actuator assembly 28c downward to an engagement position such that tooling unit 36c engages master unit 38, as indicated by arrow 62. At this point, tooling unit 36c may unlock from grip unit 34c and lock to master unit 38. Additionally, control of deposition head 22c may now transfer from head tool changer 12 and HTC controller 30 to system 10 and system controller 20. In particular, deposition head 22c may receive electrical power and control signals from system controller 20 respectively via master unit 38 and tooling unit 36c, and the electrical power and control signals relayed through actuator assembly 28c, grip unit 34c, and tooling unit 36c may be cut off.

As shown in FIG. 2N, HTC controller 30 may then retract actuator assembly 28c to its raised position, as indicated by arrow 64. This correspondingly disengages tooling unit 36c from grip unit 34a, and raises grip unit 34c upward into head tool changer 12. As shown in FIG. 2O, HTC controller 30 may then direct tool rest assembly 26 to slide back along the x-axis to extend below actuator assemblies 28a-28d, as indicated by arrow 66.

As shown in FIG. 2P, HTC controller 30 may then direct actuator assemblies 28a-28d to extend downward to their resting positions such that tooling units 36a, 36b, and 36d rest on tool rest assembly 26, as indicated by arrows 68. At this point, system controller 12 may also direct gantry 18 to move deposition head 22c (and tooling unit 36c and master unit 38) around in the horizontal x-y plane within build chamber 14 (shown in FIG. 1). This allows deposition head 22c to deposit a consumable material to build an additional portion of a 3D model or support structure using the layer-based additive technique.

This process may then be repeated in a variety of patterns for building the 3D model and support structure with the materials from one or more of deposition heads 22a-22d. As discussed above, initializing the idle deposition heads with head tool changer 12 in tandem with the operation of the active deposition head may substantially reduce the overall build time. Additionally, the interchangeability of deposition heads 22a-22d allows deposition heads 22a-22d to each include a single deposition line (e.g., a single extrusion line). This precludes the need for a second, non-active deposition line, which may otherwise interfere with the deposition from the active deposition line (e.g., material leakage).

Furthermore, the interchangeability of deposition heads 22a-22d allows different materials to be deposited from deposition heads 22a-22d. This allows the 3D model and/or support structure to each be built with multiple materials having different physical, chemical, and/or aesthetic properties. For example, deposition head 22a may deposit an acrylonitrile-butadiene-styrene (ABS) modeling material that is black in color, deposition head 22b may deposit an ABS modeling material that is red in color, deposition head 22c may deposit an ABS-polycarbonate modeling material that is blue in color, and deposition head 22d may deposit a support material for building a corresponding support structure. Building 3D models from multiple materials may increase the functional and aesthetic properties of the given 3D models compared to a 3D model built from a single material.

Moreover, deposition heads 22a-22d may exhibit different build parameters. For example, one or more of deposition heads 22a-22d may be a jetting head while others are extrusion heads. Additionally, deposition heads 22a-22d may operate at different extrusion temperatures for use with different consumable materials and/or may have different extrusion tip sizes. These different parameters may be desirable in many applications and they increase the design ranges of 3D models and support structures that may be built with system 10.

FIG. 3 is a schematic illustration of the engagements between grip unit 34a, tooling unit 36a, and master unit 38, which corresponds to the examples shown in FIGS. 2D and 2J, where actuator assembly 28a is extended downward to its engagement position. The following discussion of deposition head 22a, grip unit 34a, tooling unit 36a, and master unit 38 may also apply to each additional actuator assembly of head tool changer 12 (e.g., actuator assemblies 28b-28d) in the same manner.

As shown in FIG. 3, when engaged together, grip unit 34a and tooling unit 36a define power line 70, which is one or more conductive lines configured to receive electrical power from head tool changer 12 (via one or more external power lines), and to relay the electrical power to deposition head 22a. Additionally, grip unit 34a and tooling unit 36a define signal line 72, which is one or more data communication lines configured to receive control signals from HTC controller 30 (via one or more external signal lines), and to relay the control signals to deposition head 22a.

Similarly, when engaged together, master unit 38 and tooling unit 36a define power line 74, which is one or more conductive lines configured to receive electrical power from system 10 (via one or more external power lines), and to relay the electrical power to deposition head 22a. Additionally, master unit 38 and tooling unit 36a define signal line 76, which is one or more data communication lines configured to receive control signals from system controller 20 (via one or more external signal lines), and to relay the control signals to deposition head 22a.

Deposition head 22a is secured to tooling unit 36a, which allows deposition head 22a to receive electrical power from either power line 70 or power line 72, and to receive control signals from either signal line 72 or signal line 74, depending on whether head tool changer 12 or system 10 is selected as the controlling system. The transfer of which system controls deposition head 22a may be made when tooling unit 36a is engaged with grip unit 34a and with master unit 38.

In one embodiment, the direction of the transfer of control may be determined based on the sequence of operation and the previous state of control. For example, while actuator assembly 28a is loading tooling unit 36a and deposition head 22a to gantry 18 (e.g., as shown in FIG. 2D), HTC controller 30 has initial control over deposition head 22a. As such, when tooling unit 36a engages master unit 38, control may transfer from HTC controller 30 to system controller 20. Alternatively, while actuator assembly 28a is removing tooling unit 36a and deposition head 22a from gantry 18 (e.g., as shown in FIG. 2J), system controller 20 has initial control over deposition head 22a. As such, when grip unit 34a engages tooling unit 36a, control may transfer from system controller 20 to HTC controller 30. System controller 20 and HTC controller 30 may also communicate with each other to initiate the transfers of control.

Providing electrical power and control signals to deposition head 22a while retained in head tool changer 12 is desirable for initializing deposition head 22a in tandem with the operation of another deposition head in gantry 18. As discussed above, this can substantially reduce the overall build time. Otherwise, if the idle deposition heads only received electrical power and signal controls while loaded to gantry 18, the non-active deposition heads would need to be loaded to gantry 18 before they could be initialized. This would effectively eliminate the benefits of head tool changer 12 for reducing overall build times.

As further shown in FIG. 3, the engagement between grip unit 34a and tooling unit 36a also defines locking mechanism 78, which is a first mechanism for locking tooling unit 36a to grip unit 34a. Locking mechanism 78 may function in a variety of manners, such as electromechanical or pressure-based (e.g., pneumatic or hydraulic) locks. Accordingly, when engaged together, grip unit 34a and tooling unit 36a define conduit 80, which may be one or more power lines for supplying electrical power to locking mechanism 78 (for electromechanical locks) or one or more fluid lines for providing and expelling pressurized fluids to and from locking mechanism 78 (for pneumatic or hydraulic locks).

Similarly, the engagement between tooling unit 36a and master unit 38 defines locking mechanism 82, which is a second mechanism for locking tooling unit 36a to master unit 38. Locking mechanism 82 may also function in a variety of manners, such as electromechanical or pressure-based (e.g., pneumatic or hydraulic) locks. Accordingly, when engaged together, master unit 38 and tooling unit 36a define conduit 84, which may be one or more power lines for supplying electrical power to locking mechanism 82 (for electromechanical locks) or one or more fluid lines for providing and expelling pressurized fluids to and from locking mechanism 82 (for pneumatic or hydraulic locks).

For example, while actuator assembly 28a loads tooling unit 36a and deposition head 22a to gantry 18 (e.g., as shown in FIG. 2D), tooling unit 36a is initially locked to grip unit 34a (i.e., locking mechanism 78 is activated). As such, when tooling unit 36a engages master unit 38, in addition to transferring the control of deposition head 22a from HTC controller 30 to system controller 20, locking mechanism 78 may deactivate and locking mechanism 82 may activate, thereby locking tooling unit 36a to master unit 38. Alternatively, while actuator assembly 28a is removing tooling unit 36a and deposition head 22a from gantry 18 (e.g., as shown in FIG. 2J), tooling unit 36a is initially locked to master unit 38 (i.e., locking mechanism 82 is activated). As such, when grip unit 34a engages tooling unit 36a, in addition to transferring the control of deposition head 22a from system controller 20 back to HTC controller 30, locking mechanism 82 may deactivate and locking mechanism 78 may activate, thereby locking tooling unit 36a to grip unit 34a. This locking arrangement provides an efficient manner for interchangeably retaining tooling unit 36a (and deposition head 22a) with either grip unit 34a or master unit 38.

As discussed above, FIGS. 4-13 illustrate suitable features of the components described in FIGS. 2A-2P and 3, pursuant to one embodiment of the present disclosure. For ease of discussion, the components of head tool changer 12 discussed in FIGS. 4-13 are described with the same reference labels as those used for the components discussed in FIGS. 2A-2P and 3.

Figure 4:
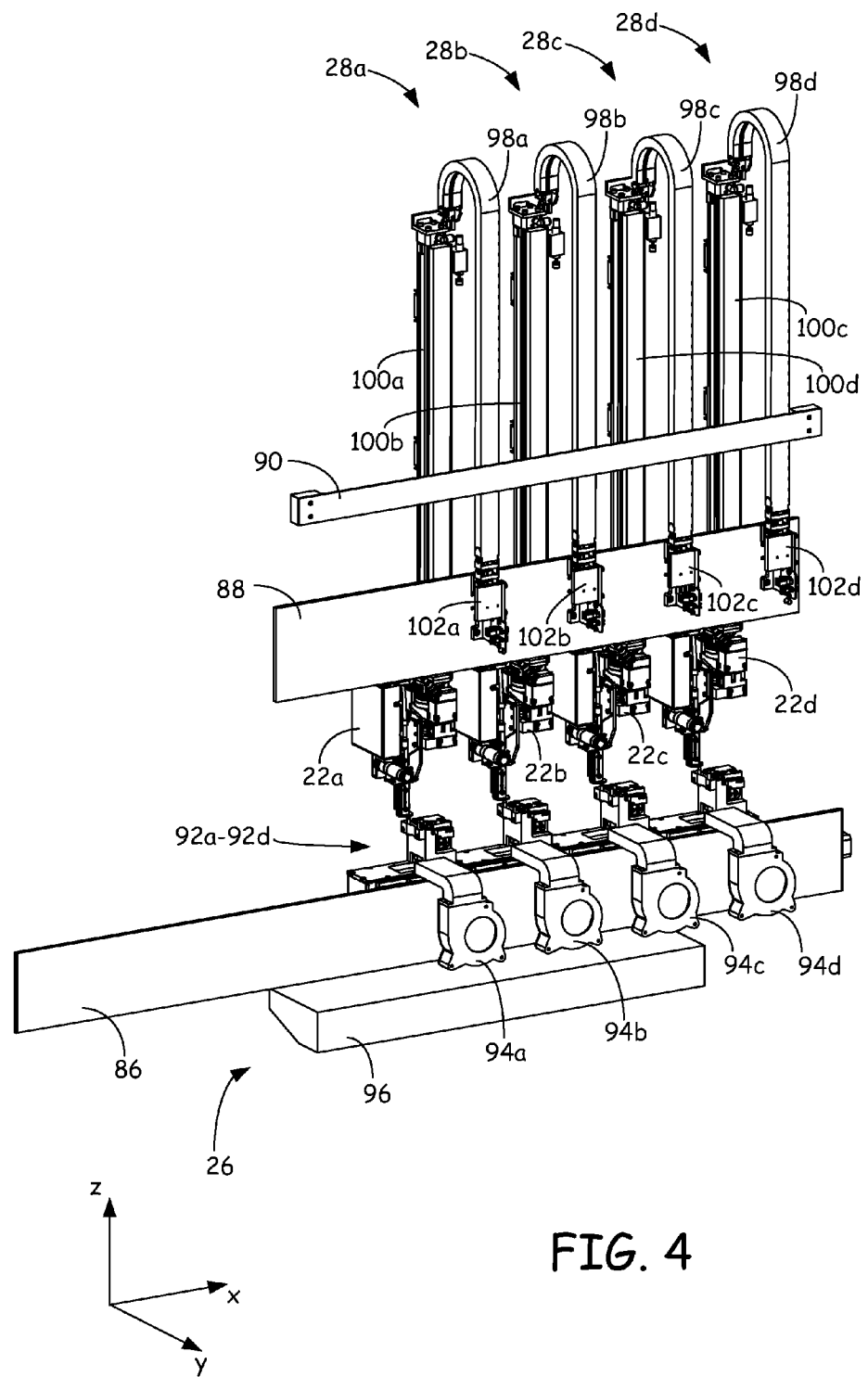
FIG. 4 is a front perspective view of a tool rest assembly and actuator assemblies of the head tool changer.
Figure 5:
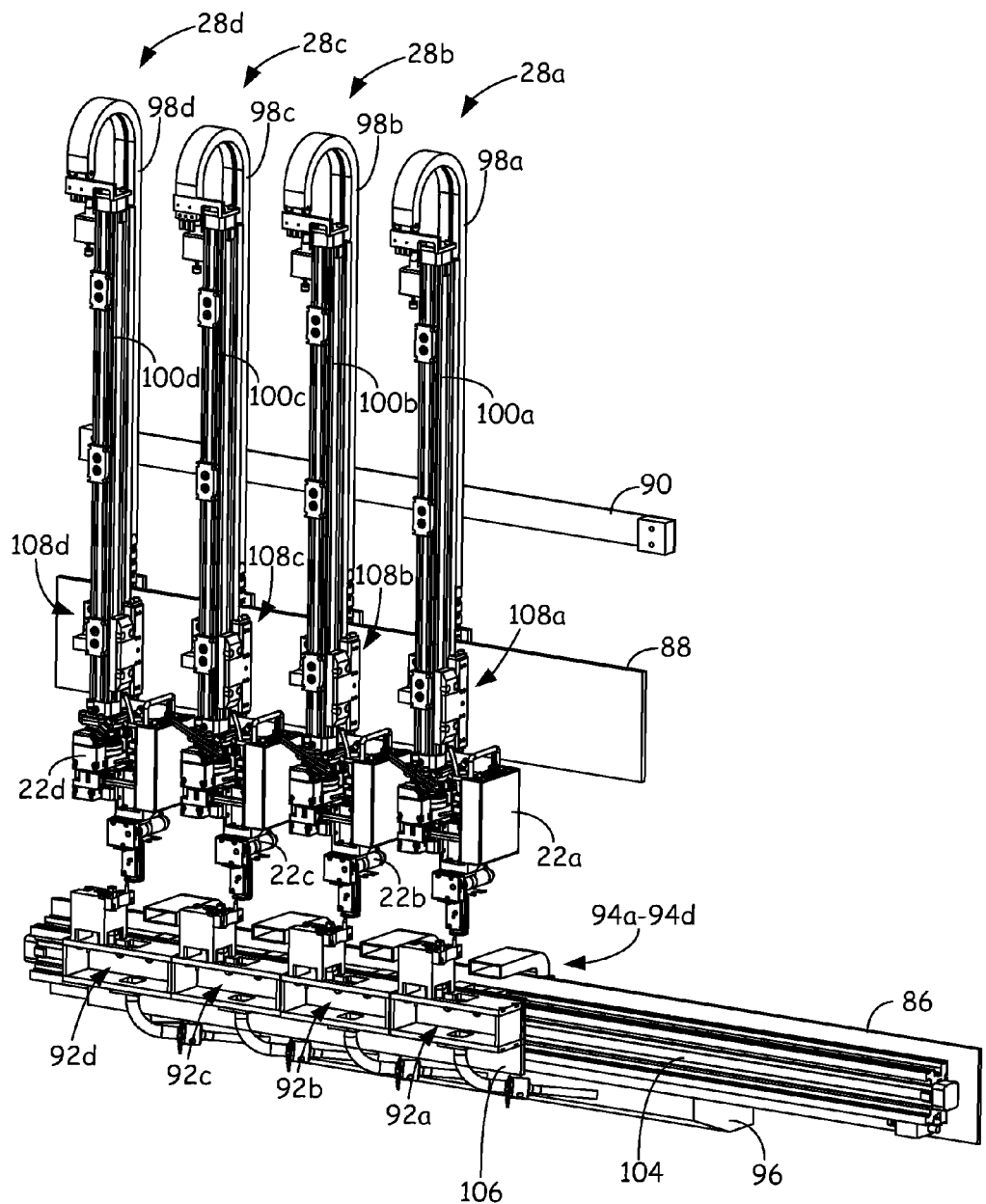
FIG. 5 is a rear perspective view of the tool rest assembly and the actuator assemblies of the head tool changer.

FIGS. 4 and 5 are expanded front and rear perspective views of tool rest assembly 26 and actuator assemblies 28a-28d of head tool changer 12. As shown in FIG. 4, tool head changer 12 also includes cross plates 86 and 88, and retention member 90, each of which are desirably secured to a frame structure of head tool changer 12 (not shown). Tool rest assembly 26 may be secured to the frame structure with cross plate 86, thereby positioning tool rest assembly 26 at a bottom front location of head tool changer 12 in the shown embodiment. Similarly, actuator assemblies 28a-28d may each be secured to the frame structure with cross plate 88, thereby allowing actuator assemblies 28a-28d to be suspended over gantry 18 (shown in FIG. 1) and tool rest assembly 26. Retention member 90 is an additional plate configured to restrict lateral movement of actuator assemblies 28a-28d along the y-axis.

As further shown, tool rest assembly 26 includes tool rests 92a-92d, air circulators 94a-94d, and purge receptacle 96, where air circulators 94a-94d may be secured to cross plate 86. As discussed below, tool rests 92a-92d and purge receptacle 96 are desirably slidable relative to cross plate 86 to slide along the x-axis, as discussed above.

Actuator assemblies 28a-28d respectively include actuator arms 98a-98d and guide rails 100a-100d, where the bottom ends of actuator arms 98a-98d are respectively secured to cross plate 88 with mounting brackets 102a-102d. The top ends of actuator arms 98a-98d are respectively connected to the top ends of guide rails 100a-100d, thereby allowing the retraction and extension of actuator arms 98a-98d to respectively move guide rails 100a-100d upward and downward between the raised position and one or more lowered positions (e.g., the resting and engagement positions).

As shown in FIG. 5, tool rest assembly 26 also includes slide track 104 and mounting plate 106, where mounting plate 106 is configured to move back and forth along the x-axis on slide track 104. HTC controller 30 may move mounting plate 106 with the use of a variety of drive mechanisms, such as pneumatic drives, hydraulic drives, and electrochemical motor drives. Tool rests 92a-92d are secured to mounting plate 106, and purge receptacle 96 is desirably secured to tool rests 92a-92d. This arrangement allows tool rests 92a-92d to slide along the x-axis, as discussed above, to avoid obstructing the lowering of actuator assemblies 28a-28d to their engagement positions. The use of tool rests 92a-92d and purge receptacle 96 for initializing deposition heads 22a-22d is further discussed below.

Actuator assemblies 28a-28d also respectively include sleeve brackets 108a-108d, which are secured to cross plate 88. Guide rails 100a-100d respectively extend through sleeve brackets 108a-108d, thereby restricting the movement of guide rails 100a-100d to upward and downward directions along the vertical z-axis.

Figure 6:
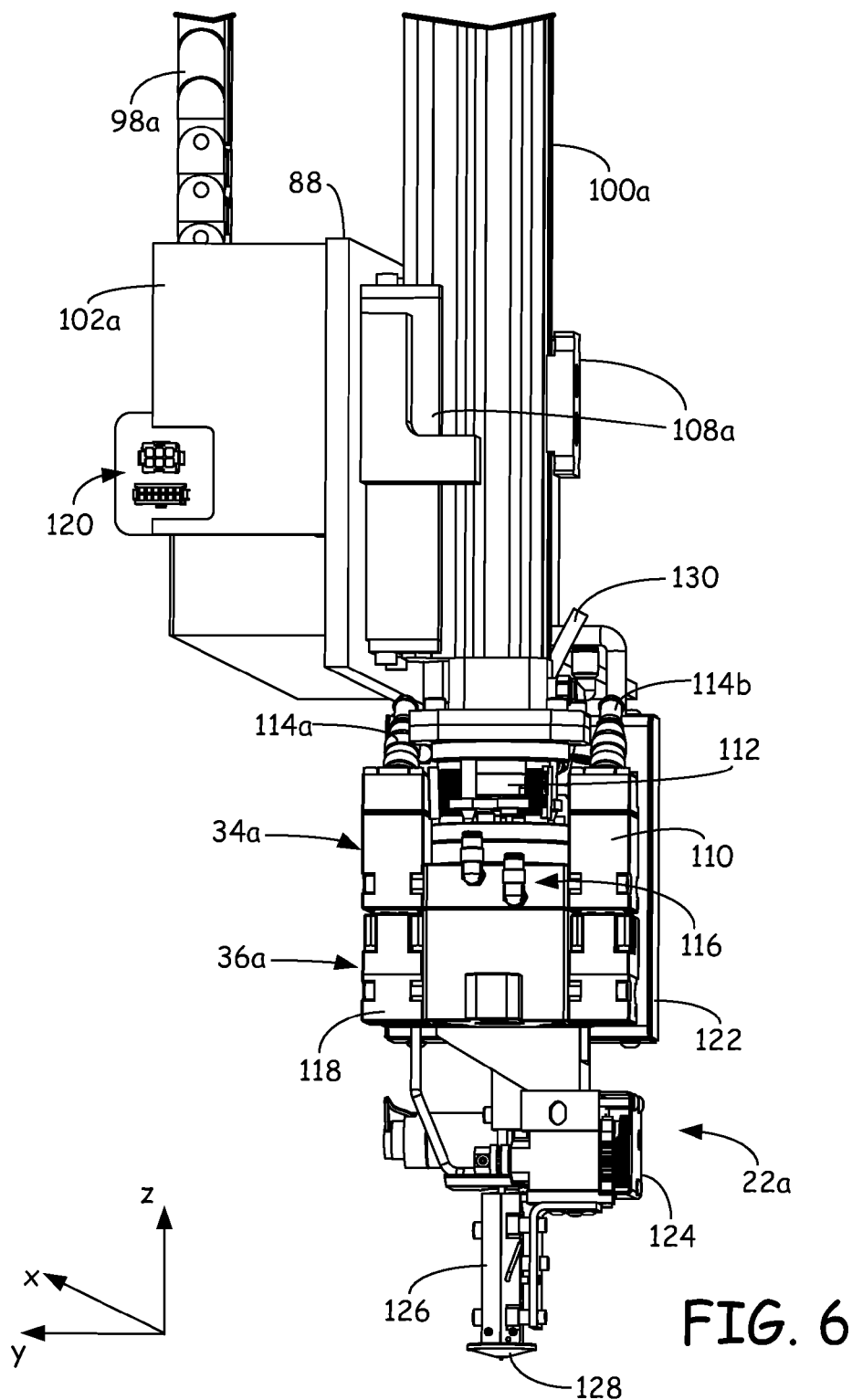
FIG. 6 is a first side perspective view of one of the actuator assemblies and grip units retaining a tooling unit and a deposition head.
Figure 7:
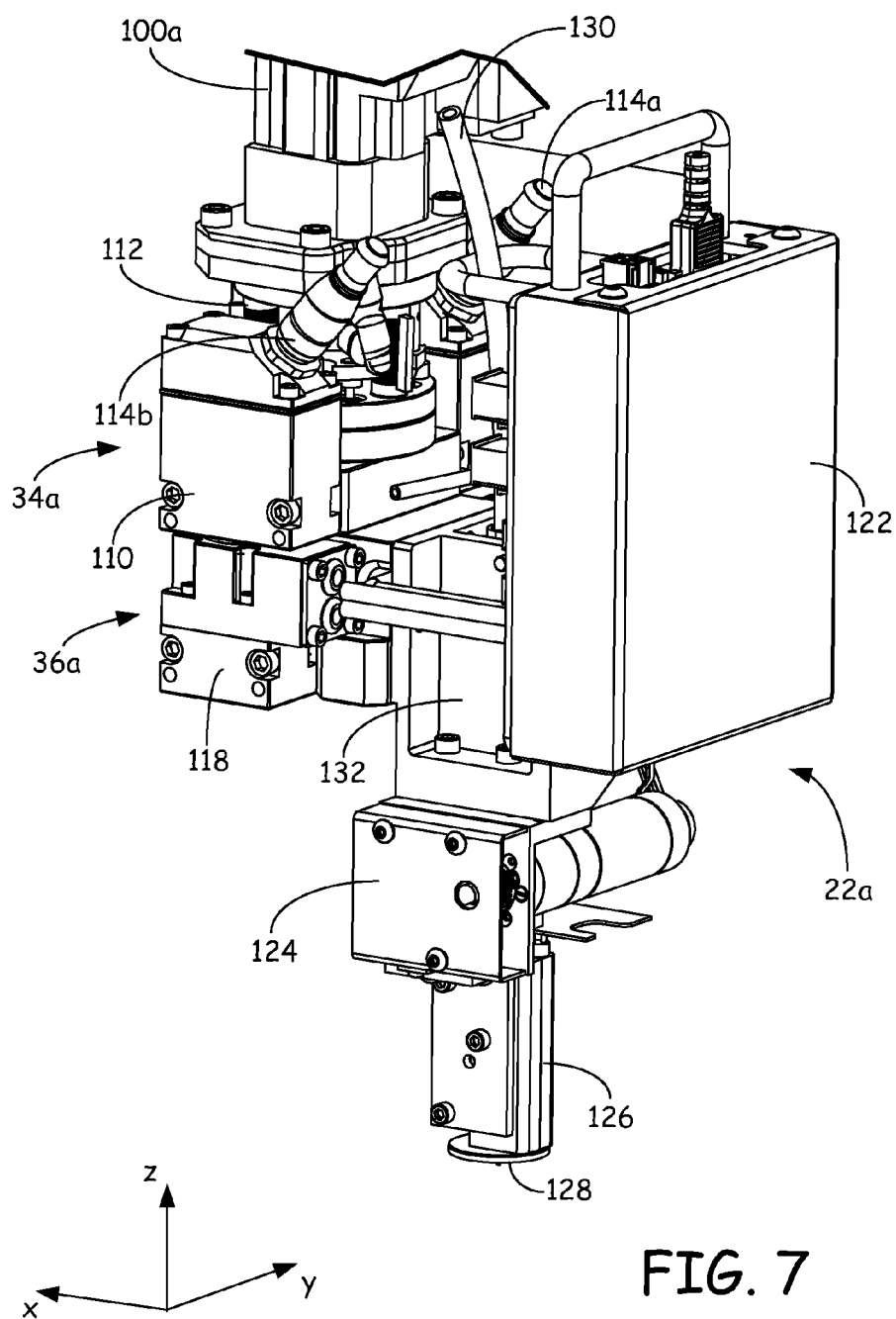
FIG. 7 is a second side perspective view of the actuator assembly and the grip unit retaining the tooling unit and the deposition head, which is taken from an opposing side from the view shown in FIG. 6.

The following discussion in FIGS. 6-13 is directed to deposition head 22a, actuator assembly 28a, grip unit 34a, and tooling unit 36a. However, the discussion may also apply to deposition heads 22b-22d, actuator assemblies 28b-28d, grip units 34b-34d, and tooling units 36b-36d in the same manner. FIGS. 6 and 7 are opposing side perspective views of grip unit 34a and tooling unit 36a operably connecting guide rail 100a and deposition head 22a.

As shown in FIG. 6, grip unit 34a includes base component 110, compensator 112, leads 114a and 114b, and couplings 116. Base component 110 is the portion of grip unit 34a that engages with and is lockable to tooling unit 36a with locking mechanism 78 (shown in FIG. 3). In the shown embodiment, base component 110 is fabricated from multiple sub-blocks that are secured together with fasteners. In an alternative embodiment, base component 110 may be fabricated as an integral block. Compensator 112 is secured to the top surface of base component 110, and is the portion of grip unit 34a that is secured to the bottom end of guide rail 102a. As discussed below, compensator 112 allows tooling unit 36a to float laterally and vertically when engaging tooling unit 36a with master unit 38.

Leads 114a and 114b are electrical connections secured to base component 110, and are configured to be connected to external cables (not shown) to receive electrical power and control signals from head tool changer 12 and HTC controller 30, as discussed above for power line 70 and signal line 72 (shown in FIG. 3).

Couplings 116 are gas couplings secured to base component 110, and are configured to be connected to external fluid conduits (not shown) to receive and expel pressurized gases to operate locking mechanism 78, as discussed above for conduit 80 (shown in FIG. 3). Accordingly, in this embodiment, locking mechanism 78 may function as a pneumatic locking mechanism. In one embodiment, the external fluid conduits for supplying and recycling the pressurized gases may also extend along or within actuator arm 98a and guide rail 100a to connect with couplings 116.

Tooling unit 36a includes base component 118, which is secured to deposition head 22a and is the portion of tooling unit 36a that engages with and is lockable to base component 110 of grip unit 34a with locking mechanism 78. In the shown embodiment, base component 118 is also fabricated from multiple sub-blocks that are secured together with fasteners. In an alternative embodiment, base component 118 may be fabricated as an integral block.

As further shown in FIG. 6, actuator assembly 28a also includes electrical connections 120 adjacent to mounting bracket 102a, where electrical connections 120 are configured to receive electrical power and control signals from head tool changer 12 and HTC controller 30 via one or more external electrical cables (not shown). This allows HTC controller 30 to direct the operation of actuator assembly 28a for raising and lowering guide rail 100a along the vertical z-axis. In addition, one or more cables (not shown) may also extend along or within actuator arm 98a and guide rail 100a, thereby relaying the electrical power and control signals from electrical connections 120 to leads 114a and 114b of grip unit 34a.

In the shown embodiment, deposition head 22a includes control board 122, drive mechanism 124, thermal block 126, and extrusion tip 128, which may form a single extrusion line, such as a single extrusion line of the extrusion head described in Leavitt, U.S. Patent Application Publication No. 2009/0035405. Drive mechanism 124 may receive a filament of a consumable material from one or more supply sources retained in bays 19 (shown in FIG. 1) through guide tube 130.

As shown in FIG. 7, deposition head 22a also include bracket 132. Bracket 132 is a frame component of deposition head 22a and may retain control board 122, drive mechanism 124, and thermal block 126. Bracket 132 is also the portion of deposition head 22a that may be secured to base component 118 of tooling unit 36a.

Figure 8:
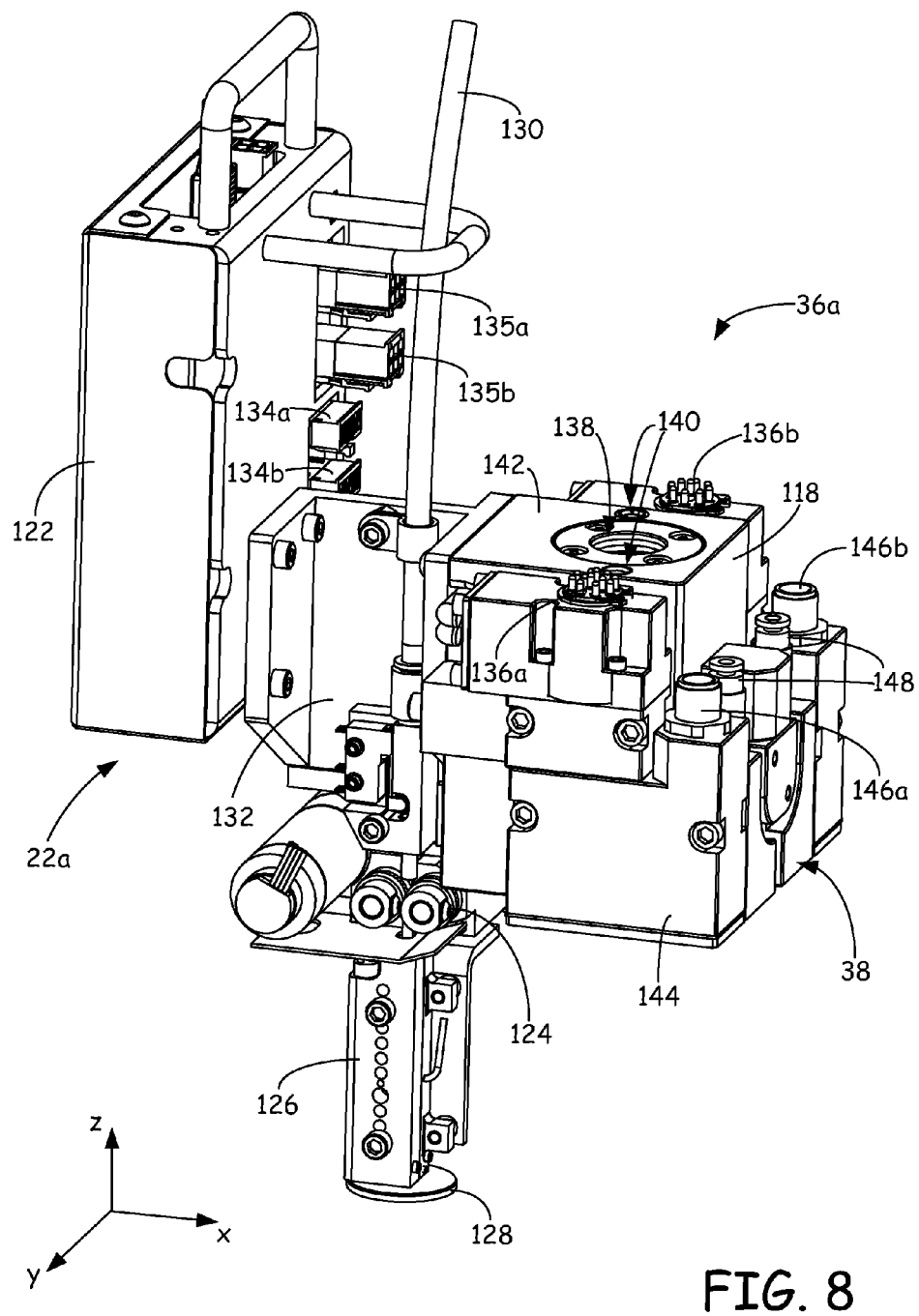
FIG. 8 is a top perspective view of the tooling unit and the deposition head engaged with the master unit.

FIG. 8 is a front perspective view of tooling unit 36a and deposition head 22a engaged with master unit 38. As shown, control board 122 of deposition head 22a includes power connection ports 134a and 134b, and signal connection ports 135a and 135b, which are configured to receive electrical power and control signals from tooling unit 36a via external cables (not shown). For example, power connection port 134a and signal connection port 135a are configured to receive electrical power and control signals from grip unit 34a and tooling unit 36a, as discussed above for power line 70 and signal line 72 (shown in FIG. 3). Correspondingly, power connection port 134b and signal connection port 135b are configured to receive electrical power and control signals from master unit 38 and tooling unit 36a, as discussed above for power line 74 and signal line 76 (shown in FIG. 3).

Tooling unit 36a also includes electrical contacts 136a and 136b, lock ring 138, guide holes 140, and top surface 142, where top surface 142 is the surface of base component 118 that engages with grip unit 34a. Electrical contacts 136a and 136b are conductive contacts located at top surface 142, and are configured to engage with reciprocating electrical contacts (not shown in FIG. 8) located at a bottom surface of grip unit 34a. This allows the electrical power and control signals that are received through leads 114a and 114b of grip unit 34a (shown in FIGS. 6 and 7) to be relayed to tooling unit 36a, as discussed above.

Lock ring 138 is a female portion of locking mechanism 78 (shown in FIG. 3) disposed in base component 118 at top surface 142. Lock ring 138 is configured to receive a reciprocating male portion of locking mechanism 78 retained by grip unit 34a for locking tooling unit 36a to grip unit 34a.

Guide holes 140 are a pair of holes extending within base component 118 at top surface 142, and are configured to receive guide pins (not shown in FIG. 8) extending from the bottom surface of grip unit 34a. This arrangement allows the guide pins to align with guide holes 140 when grip unit 34a and tooling unit 36a engage each other.

As further shown in FIG. 8, master unit 38 includes base component 144, leads 146a and 146b, and couplings 148. Base component 144 is the portion of master unit 38 that engages with and is lockable to the bottom surface of tooling unit 36a with locking mechanism 82 (shown in FIG. 3). Base component 144 is also the portion that may be secured to a carriage of gantry 18, such as in an adjustable head mount as disclosed in Comb et al., U.S. patent application Ser. No. 12/255,289. In the shown embodiment, base component 144 is also fabricated from multiple sub-blocks that are secured together with fasteners. In an alternative embodiment, base component 144 may be fabricated as an integral block.

Leads 146a and 146b are electrical connections secured to base component 144, and are configured to be connected to external cables (not shown) to receive electrical power and control signals from system 10 and system controller 20, as discussed above for power line 74 and signal line 76 (shown in FIG. 3). Couplings 148 are gas couplings secured to base component 144, and are configured to be connected to external fluid conduits (not shown) to receive and expel pressurized gases to operate locking mechanism 82, as discussed above for conduit 84 (shown in FIG. 3). Accordingly, in this embodiment, locking mechanism 82 may also function as a pneumatic locking mechanism.

Figure 9A:
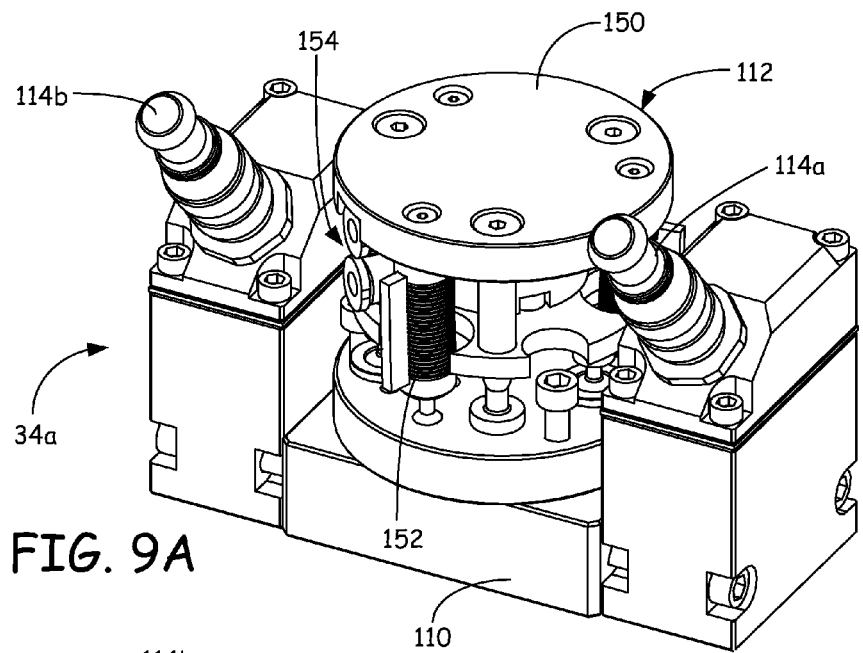
FIG. 9A is a top perspective view of the grip unit.
Figure 9B:
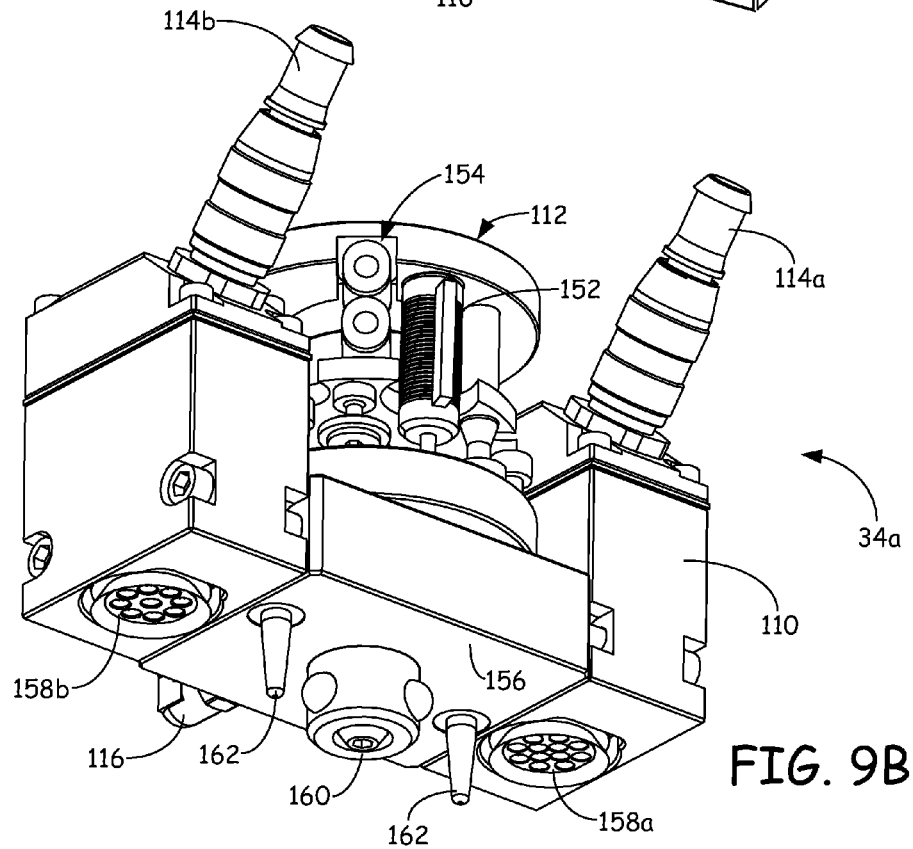
FIG. 9B is a bottom perspective view of the grip unit.

FIGS. 9A and 9B are respectively top and bottom perspective views of grip unit 34a. As shown in FIG. 9A, compensator 112 includes top surface 150, springs 152, and electrical ports 154, and is configured to switch between an unlocked state and a locked state based on signals received through electrical ports 154. Top surface 150 is the portion of compensator 112 that may be secured to the bottom end of guide rail 100a (shown in FIGS. 4-7). While in the unlocked state, springs 152 allow grip unit 34a (and tooling unit 36a when engaged with grip unit 34a) to float laterally and vertically. This correspondingly provides grip unit 34a a small freedom of movement when actuator assembly 28a is aligning with master unit 38. As such, when deposition head 22a is being loaded to gantry 18, compensator 112 is desirably set to the unlocked state while grip unit 34a and tooling unit 36a align and engage with master unit 38. When tooling unit 36a engages with master unit 38, compensator 112 may then be locked to prevent further lateral or vertical floating.

As shown in FIG. 9B, grip unit 34a further includes bottom surface 156, electrical contacts 158a and 158b, lock extension 160, and guide pins 162. Bottom surface 156 is the surface of grip unit 34a that may engage with top surface 142 of tooling unit 36a (shown in FIG. 8). Electrical contacts 158 and 158b are conductive contacts located at bottom surface 156, and are configured to engage with electrical contacts 136a and 136b (shown in FIG. 8) of tooling unit 36a.

Lock extension 160 is a male portion of locking mechanism 78 (shown in FIG. 3) extending from bottom surface 156, and is configured to extend into lock ring 138 of tooling unit 36a for locking grip unit 34a to tooling unit 36a. In the shown embodiment, lock extension 160 includes a plurality of plugs that are capable of expanding outward and contracting inward from lock extension 160 based on the pressure within lock extension 160. As a result, lock extension 160 may be secured to lock ring 138 by introducing pressurized gas through couplings 116, which cause the plugs to expand outward to physically trap lock extension 160 in lock ring 138. Guide pins 162 are a pair of pins extending downward from bottom surface 156, and are configured to engage guide holes 140 of tooling unit 36a, as discussed above.

Figure 10A:
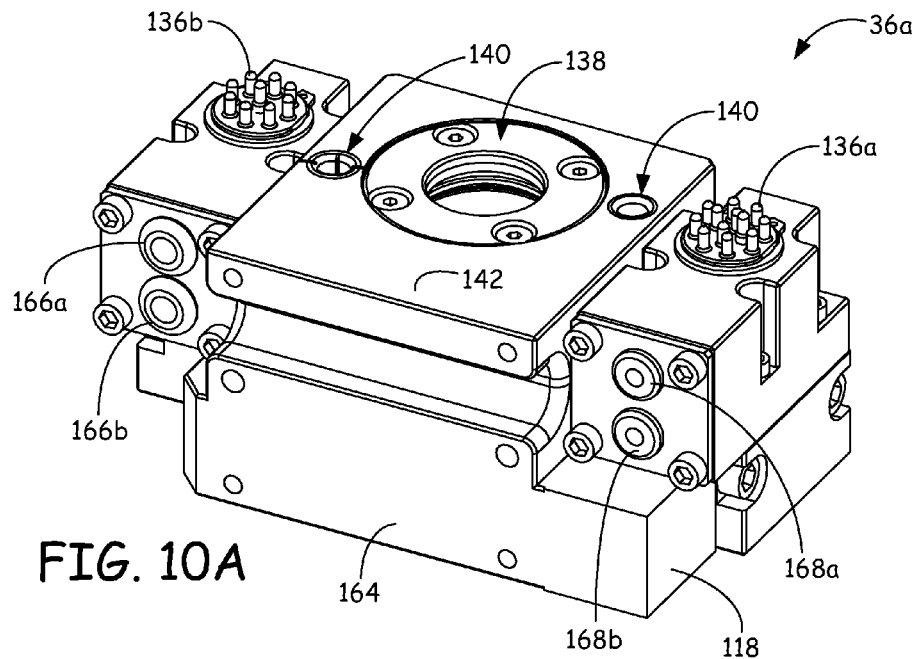
FIG. 10A is a top perspective view of the tooling unit.
Figure 10B:
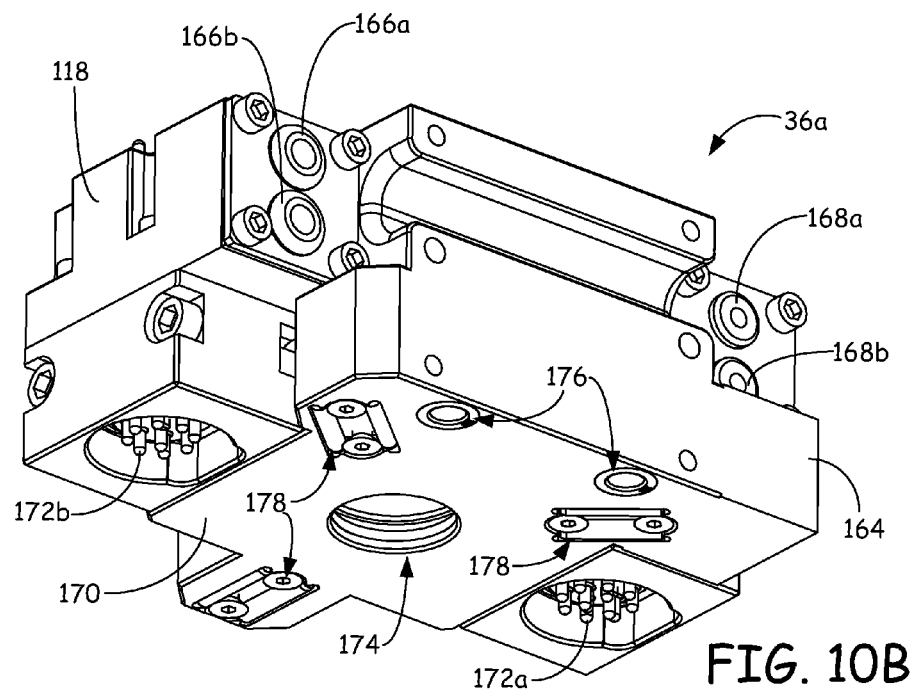
FIG. 10B is a bottom perspective view of the tooling unit.

FIGS. 10A and 10B are respectively top and bottom perspective views of tooling unit 36a. As shown in FIG. 10A, tooling unit 36a also includes lateral surface 164, power connection ports 166a and 166b, and signal connection ports 168a and 168b. Lateral surface 164 is the surface of tooling unit 36a that may be secured to bracket 132 of deposition head 22a to secure deposition head 22a to tooling unit 36a. Power connection ports 166a and 166b, and signal connection ports 168a and 168b are configured to relay electrical power and control signals from tooling unit 36a respectively to power connection ports 134a and 134b and signal connection ports 135a and 135b of deposition head 22a, via external cables (not shown). As discussed above, this arrangement allows deposition head 22a to receive electrical power and control signals from power line 70 and signal line 72 (shown in FIG. 3) that are relayed through grip unit 34a and tooling unit 36a, and from power line 74 and signal line 76 (shown in FIG. 3) that are relayed through master unit 38 and tooling unit 36a.

As shown in FIG. 10B, tooling unit 36a further includes bottom surface 170, electrical contacts 172a and 172b, lock ring 174, guide holes 176, and mating guides 178. Bottom surface 170 is the surface of tooling unit 36a that may engage with master unit 38. Electrical contacts 172a and 172b are conductive contacts secured to base component 118, and are configured to engage with reciprocating electrical contacts of master unit 38 (not shown in FIG. 10B).

Lock ring 174 is a female portion of locking mechanism 82 (shown in FIG. 3) disposed in bottom surface 170, and is configured to receive a lock extension of master unit 38 (not shown in FIG. 10B). Guide holes 176 are a pair of holes extending within bottom surface 170 and are configured to receive guide pins of master unit 38 (not shown in FIG. 10B). Mating guides 178 are a plurality of guides configured to receive domes (not shown in FIG. 10B) of master unit 38. As discussed below, the engagement between the domes and mating guides 178 provide a precision mating mechanism for tooling unit 36a and master unit 38.

Figure 11A:
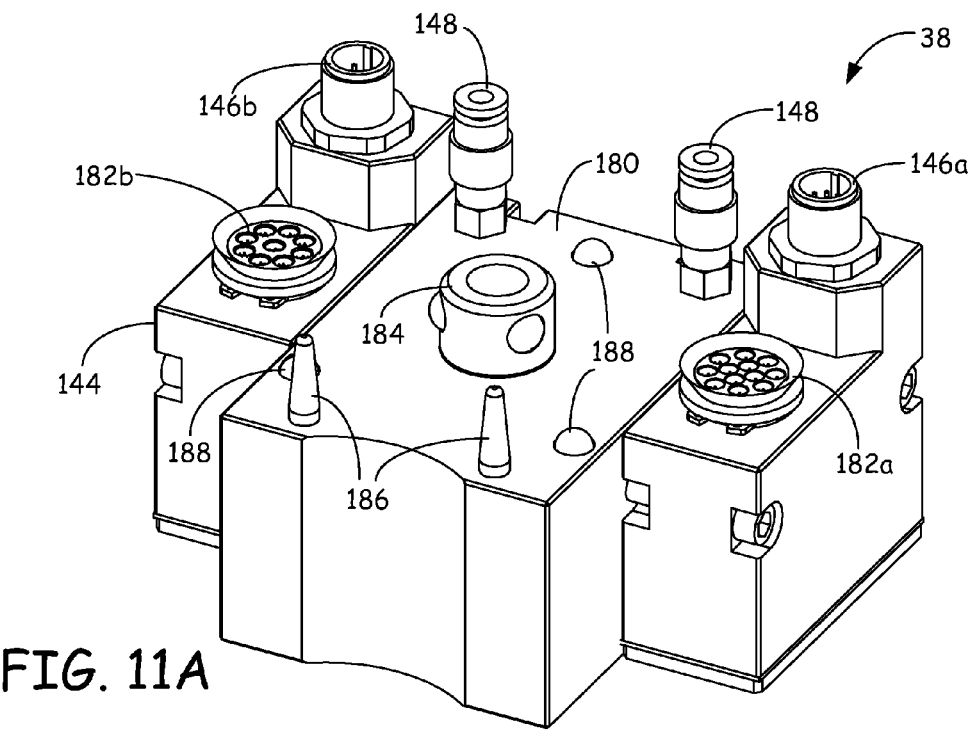
FIG. 11A is a top perspective view of the master unit.
Figure 11B:
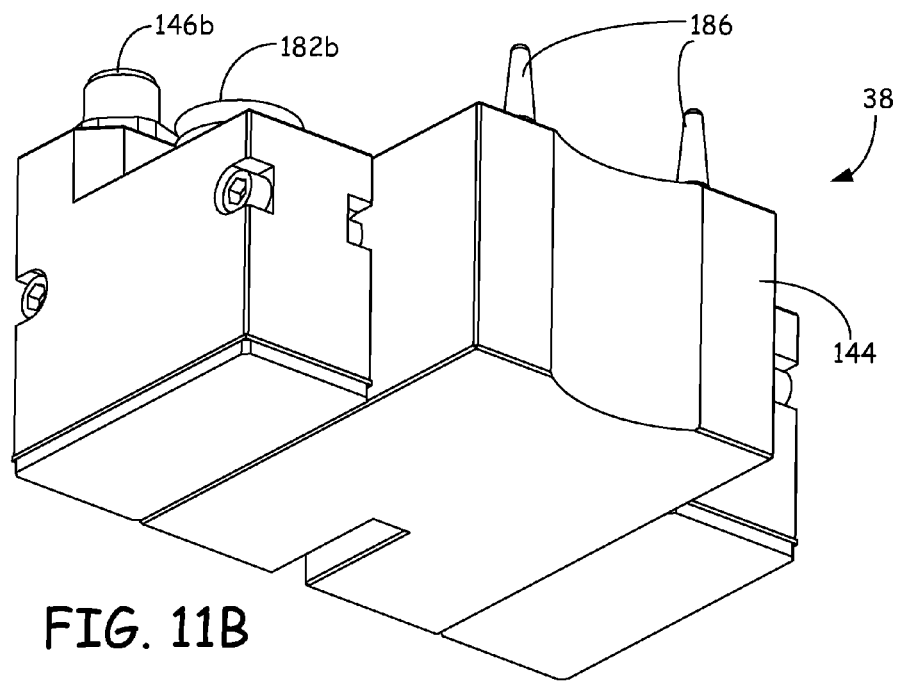
FIG. 11B is a bottom perspective view of the master unit.

FIGS. 11A and 11B are respectively top and bottom perspective views of master unit 38. As shown, master unit 38 also includes top surface 180, electrical contacts 182a and 182b, lock extension 184, guide pins 186, and domes 188. Top surface 180 is the surface of master unit 38 that may engage with bottom surface 170 of tooling unit 36a. Electrical contacts 182a and 182b are conductive contacts located at top surface 180, are configured to engage with electrical contacts 172a and 172b of tooling unit 36a. This allows the electrical power and control signals that are received through leads 146a and 146b to be relayed to tooling unit 36a, as discussed above.

Lock extension 184 is a male portion of locking mechanism 82 (shown in FIG. 3) extending from top surface 180, and may function in the same manner as lock extension 160 (shown in FIG. 9B). Accordingly, lock extension 184 is configured to extend into lock ring 174 of tooling unit 36a, thereby allowing master unit 38 to lock to tooling unit 36a based on the pressurized gases received via couplings 148. Guide pins 186 are a pair of pins extending upward from top surface 180, and are configured to engage guide holes 176 located bottom surface 170 of tooling unit 36a. This arrangement allows guide pins 186 to align with guide holes 176 when tooling unit 36a and master unit 38 engage each other.

Domes 188 are a plurality of topographical features (e.g., half spheres) extending above the plane of top surface 180 and are configured to engage with mating guides 178 to provide a precision mating mechanism. In the shown embodiment in which master unit 38 includes three domes 188 and tooling unit 36a includes three mating guides 178, this precision mating provides six degrees of restraint. This restraint defines a rigid body that resists lateral movement of tooling unit 36a relative to master unit 38 in the horizontal x-y plane when tooling unit 36a is locked to master unit 38. This is desirable to allow gantry 18 to prevent tooling unit 36a and deposition head 22a from moving laterally relative to master unit 38 during operation in system 10.

Figure 12B:
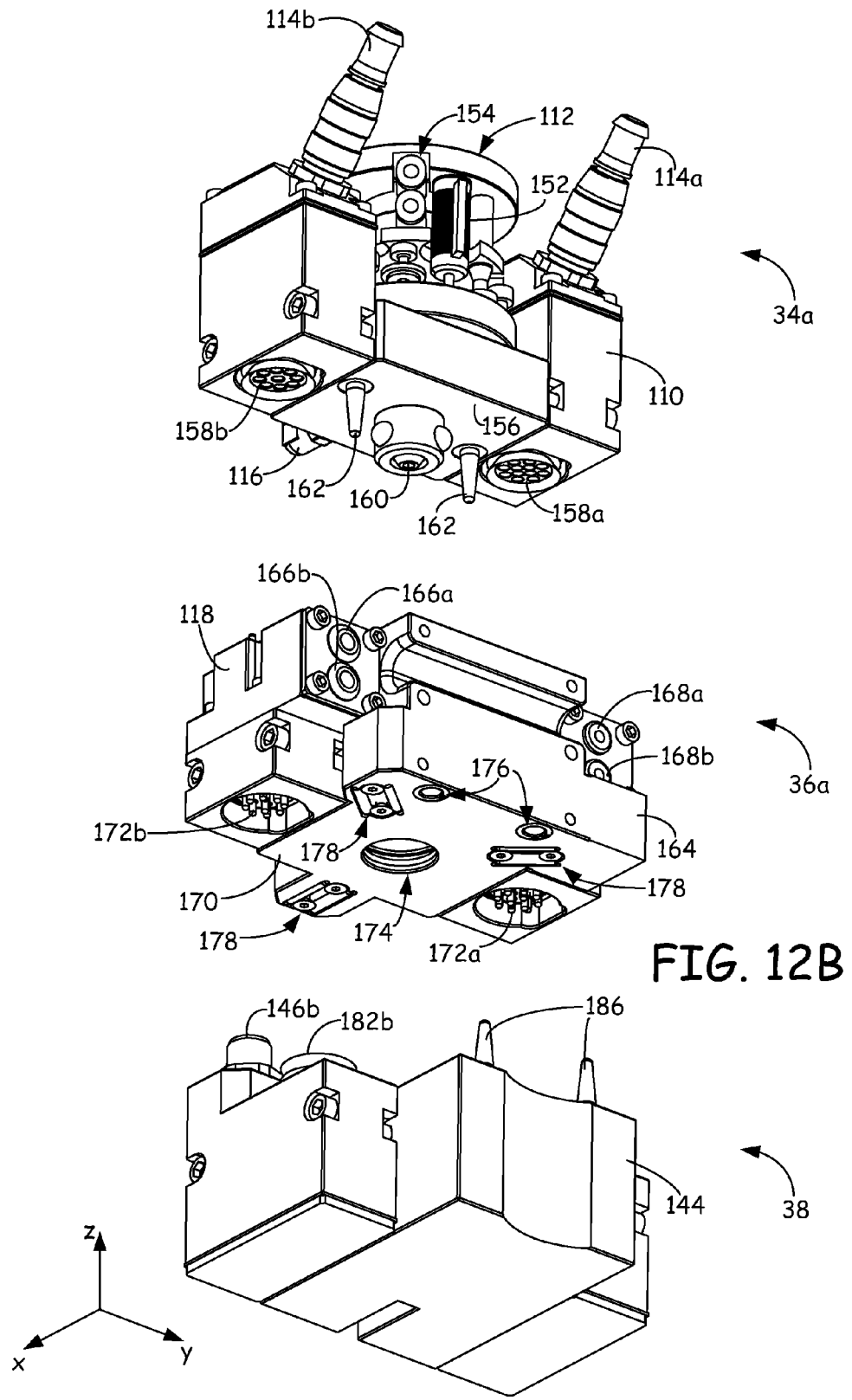
FIG. 12B is a bottom perspective view of the grip unit, the tooling unit, and the master unit.

FIGS. 12A and 12B are respectively top and bottom exploded perspective views of grip unit 34a, tooling unit 36a, and master unit 38, which illustrate their respective engagements with each other. For example, when grip unit 34a is lowered onto tooling unit 36a to retract tooling unit 36a from master unit 38 (e.g., as shown in FIG. 2J), guide pins 162 may enter guide holes 140 to align grip unit 34a with tooling unit 36a, and lock extension 160 may enter lock ring 138. The lateral freedom attained with compensator 112 in the unlocked state reduces the risk of damage to grip unit 34a and tooling unit 36a during the alignment.

When grip unit 36a engages tooling unit 36a, electrical contacts 158a and 158b of grip unit 34a engage with electrical contacts 136a and 136b of tooling unit 36a, thereby allowing electrical power and control signals to be relayed from leads 114a and 114b of grip unit 34a to electrical contacts 166a and 168a of tooling unit 36a. Head tool changer 12 may then introduce pressurized gas into couplings 116 to engage lock extension 160 within lock ring 138 to lock tooling unit 36a to grip unit 34a. Additionally, compensator 112 may be locked to restrict lateral movement.

System 10 may also release the pressurized gas from couplings 148 to unlock lock extension 184 from lock ring 174, thereby unlocking tooling unit 36a from master unit 38. Additionally, transfer of electrical power and signal control of deposition head 22a to HTC controller 30 may also occur after electrical contacts 158a and 158b engage with electrical contacts 136a and 136b. Actuator assembly 28a may then raise grip unit 34a to disengage tooling unit 36a from master unit 38, as discussed above.

Alternatively, when grip unit 34a and tooling unit 36a are lowered onto master unit 38 (e.g., as shown in FIG. 2D), guide pins 186 may enter guide holes 176 to align tooling unit 36a with master unit 38, and lock extension 184 may enter lock ring 174. The lateral freedom attained with compensator 112 in the unlocked state also reduces the risk of damage to tooling unit 36a and master unit 38 during this alignment.

When tooling unit 36a engages master unit 38, electrical contacts 172a and 172b of tool unit 36a engage with electrical contacts 182a and 182b of master unit 38, thereby allowing electrical power and control signals to be relayed from leads 144a and 144b of master unit 38 to electrical contacts 166b and 168b of tooling unit 36a. Head tool changer 12 may then introduce pressurized gas into couplings 148 to engage lock extension 184 within lock ring 174 to lock tooling unit 36a to master unit 38. Additionally, compensator 112 may be locked to restrict lateral movement.

Head tool changer 12 may also release the pressurized gas from couplings 116 to unlock lock extension 160 from lock ring 138, thereby unlocking grip unit 34a from tooling unit 36a. Additionally, transfer of electrical power and signal control of deposition head 22a to system controller 20 may also occur after electrical contacts 172a and 172b engage with electrical contacts 182a and 182b. Actuator assembly 28a may then raise grip unit 34a disengage grip unit from tooling unit 36a, as discussed above.

Figure 13:
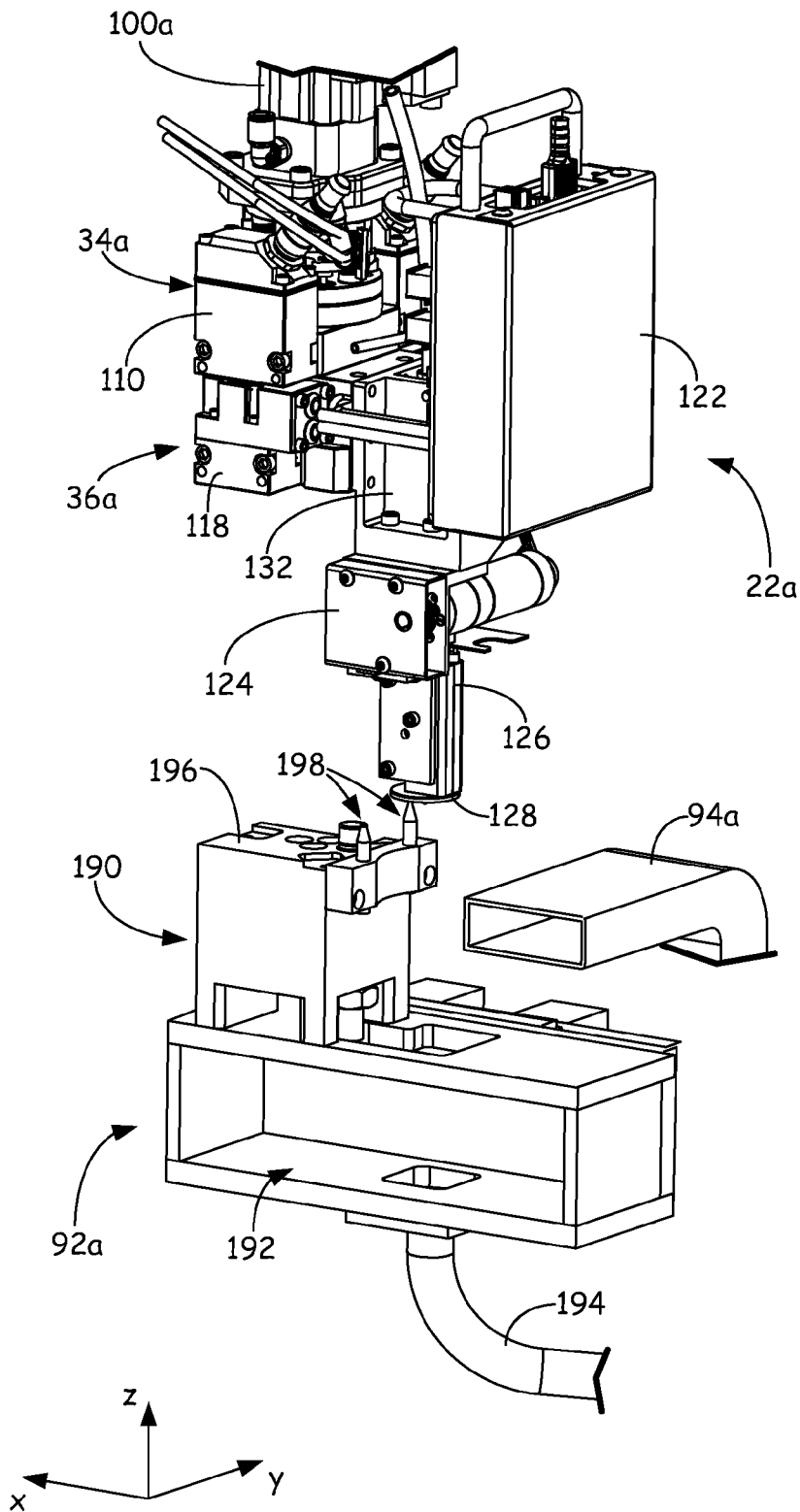
FIG. 13 is a rear perspective view of a portion of the tool rest assembly in use with a deposition head retained by the actuator assembly.

FIG. 13 is a rear perspective view of a portion of tool rest assembly 26 in use with deposition head 22a retained by actuator assembly 28a, where deposition head 22a may be retained at tool rest 92a when not loaded to gantry 18, as discussed above in FIG. 2P. As shown in FIG. 13, tool rest 92a includes tool mount 190, purge trap 192, and purge line 194. Tool mount 190 extends above purge trap 192 and includes top surface 196 and guide pins 198. Top surface 196 is the surface of tool rest 92a that may engage with bottom surface 170 of tooling unit 36a. Furthermore, guide pins 198 are configured to engage with guide holes 176 of tooling unit 36a, thereby aligning deposition head 22a into purge trap 192.

When tooling unit 36a rests on top surface 196 of tool mount 190, a portion of thermal block 126 and extrusion tip 128 extend into purge trap 192. Purge trap 192 is a secondary trap for collecting any excess purge material that does not travel into purge line 194. Purge line 194 interconnects purge trap 192 and purge receptacle 96 (shown in FIGS. 4 and 5) for directing purge material to purge receptacle 96. In one embodiment, purge receptacle 96 may be connected to a vacuum line (not shown) to actively draw purge materials through purge line 194 into purge receptacle 96. In an alternative embodiment, purge receptacle 96 may be omitted and purge line 194 may be directly connected to a vacuum line.

During an initialization process to warm up and purge deposition head 22a, deposition head 22a desirably rests on tool rest 92a. HTC controller 30 (shown in FIG. 1) may then power up deposition head 22a and heat up thermal block 126 to an operating temperature. HTC controller 30 may the direct drive mechanism 124 to feed successive portions of a consumable material to thermal block 126. The consumable material may then melt in thermal block 126 and deposit from extrusion tip 128 for a preset purge period.

During the purge operation, air circulator 94a also desirably directs cooling air to drive mechanism 124 and/or the entrance of thermal block 126 to prevent the consumable material from melting at the entrance of thermal block 126. Gantry 18 (shown in FIG. 1) may also include an additional cooling manifold (not shown) for use with a deposition head in system 10. However, air circulators 94a-94d allow the non-active deposition heads 22a-22d to also receive cooling air to prevent premature melting of the consumable materials during purge operations.

Figure 14:
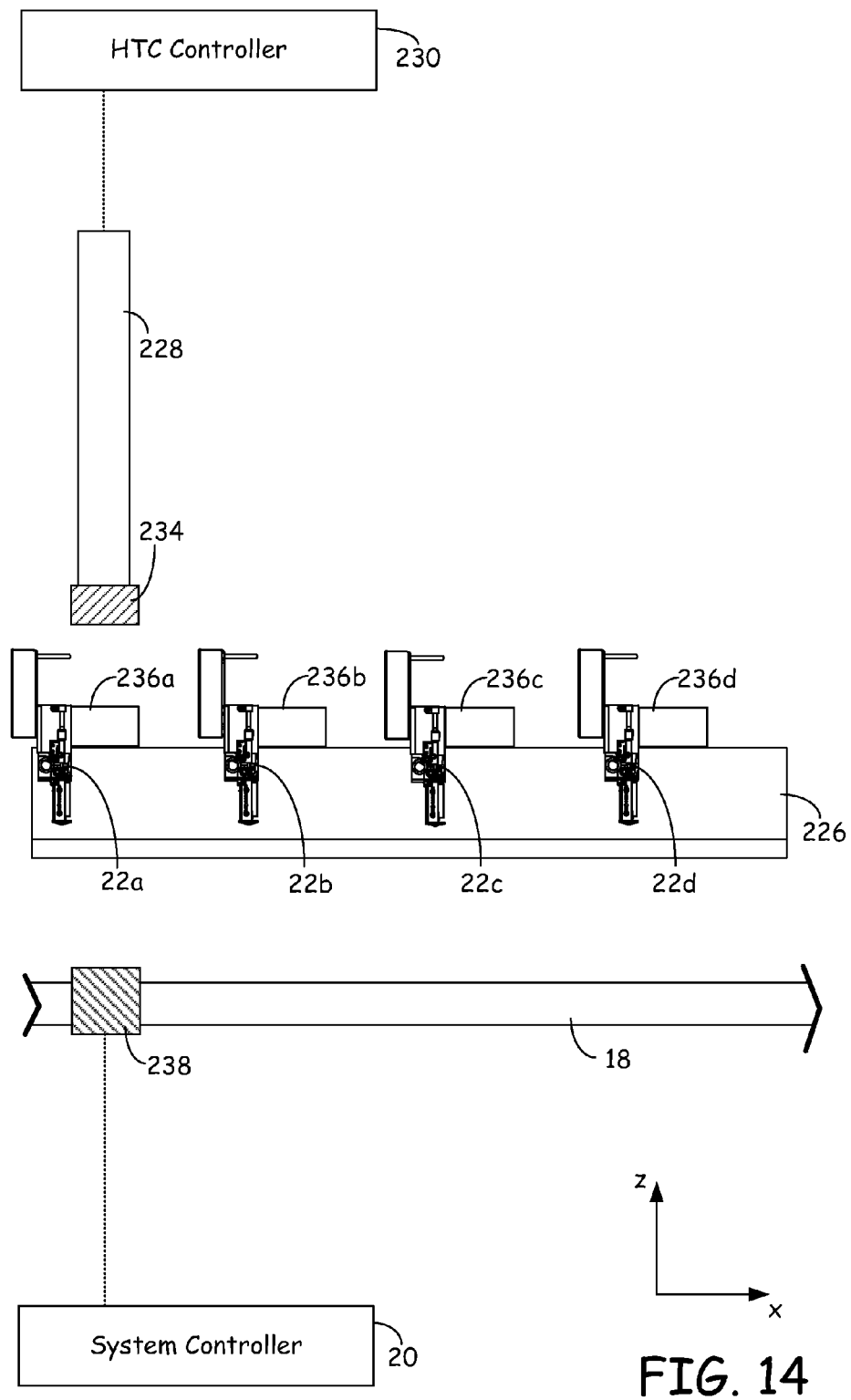
FIG. 14 is a schematic illustration of an alternative head tool changer of the present disclosure.

FIG. 14 is a schematic illustration of head tool changer 212, which is an example of an alternative head tool changer of the present disclosure for use with system 10. Head tool changer 212 functions in a similar manner as head tool changer 12, and the corresponding reference labels are increased by "200". As shown, head tool changer 212 includes a single actuator assembly 228 and a single grip unit 234 rather than multiple actuator assemblies and grip units. Accordingly, HTC controller 30 is further configured to slide tool rest assembly 226 along the x-axis to position tooling units 236a-236d below grip unit 234 in the horizontal x-y plane, thereby allowing actuator assembly 226 and grip unit 234 to selectively retain tooling units 236a-236d and deposition heads 22a-22d in an interchangeable manner for loading and uploading to and from master unit 238.

In one embodiment, the tool rests of actuator assembly 226 may each provide electrical power and control signals to deposition heads 22a-22d while tooling units 236a-236d rest on the tool rests of actuator assembly 226. In this embodiment, HTC control 230 may also be connected to the tool rests of actuator assembly 226 to relay electrical power and control signals to tooling units 236a-236d and deposition heads 22a-22d. This arrangement allows one or more deposition heads 22a-22d to be warmed up while disengaged from actuator assembly 228. Examples of suitable electrical connections include those discussed above for master units 38, 138, and 238, thereby allowing deposition heads 22a-22d to be powered and controlled from connections located below tooling units 236a-236d.

Accordingly, during operation, tool rest assembly 226 may slide along the x-axis to position one of tooling units 236a-236d below grip unit 234, and actuator assembly 228 may then extend downward to engage and lock grip unit 234 to the given tooling unit. Actuator assembly 228 may then retract to its raised position, tool rest assembly 226 may then slide out of the way (e.g., as shown above in FIG. 2C), and actuator assembly 228 may then extend downward to its engagement position to engage the given tooling unit with master unit 238, as discussed above. This process discussed above in FIGS. 2A-2P may then be applied to selectively load tooling units 236a-236d and deposition heads 22a-22d to master unit 238 and gantry 18 in an interchangeable manner.

In an alternative embodiment, actuator assembly 228 may also be movable along the x-axis to selectively position grip unit 234 over tooling units 236a-236d. Accordingly, the tool head changers of the present disclosure (e.g., head tool changers 12 and 212) may include at least one actuator assembly and at least one grip unit for loading deposition heads to gantry 18 of system 10.

Furthermore, in one embodiment, deposition heads may be supplied to head tool changers 12 and 212 in magazines, turrets, and other similar carrier units. For example, tool rest assemblies 26 and 226 may each be loadable and unloadable to and from head tool changers 12 and 212 This arrangement allows different deposition heads to be supplied to head tool changer 212. When each supply of deposition heads is provided to head tool changer 212 or 212, the given system may then perform a calibration routine to align grip units 34a-34d and 234 with the corresponding tooling units 36a-36d and 236a-236d. The supplied deposition heads may then undergo initializations and may be loaded to gantry 18 in an interchangeable manner, as discussed above. This increases the versatility of the head tool changers in providing multiple deposition heads to system 10.

Although the present disclosure has been described with reference to preferred embodiments, workers skilled in the art will recognize that changes may be made in form and detail without departing from the spirit and scope of the disclosure.

The invention claimed is:

1. A head tool changer for use with a deposition-based digital manufacturing system for building layer-based three-dimensional models, the head tool changer comprising:
   a tooling unit configured to retain a deposition head of the deposition-based digital manufacturing system;
   a master unit operably mounted to a gantry of the deposition-based digital manufacturing system, the master unit being configured to detachably engage with the tooling unit and to relay electrical power to the tooling unit;
   an actuator assembly operably mounted to the deposition-based digital manufacturing system, wherein at least a portion of the actuator assembly is configured to move along an axis toward the master unit; and
   a grip unit secured to the actuator assembly and configured to detachably engage with the tooling unit and to relay electrical power to the tooling unit;
   wherein the relay of electrical power from the grip unit to the tooling unit is configured to be cut upon the tooling unit being disengaged from the grip unit and being engaged with the master unit.

2. The head tool changer of claim 1, wherein the tooling unit is further configured to relay the electrical power received from the grip unit to the deposition head when the deposition head is engaged with the grip unit, and wherein the tooling unit is further configured to relay the electrical power received from the master unit to the deposition head when the deposition head is engaged with the master unit.

3. The head tool changer of claim 1, wherein the grip unit and the master unit are each further configured to relay control signals to the tooling unit.

4. The head tool changer of claim 1, wherein the tooling unit comprises:
   a first electrical contact configured to receive at least a portion of the electrical power relayed from the grip unit; and
   a second electrical contact configured to receive at least a portion of the electrical power relayed from the master unit.

5. The head tool changer of claim 4, wherein the grip unit comprises:
   an electrical lead configured to receive the electrical power relayed to the tooling unit from the head tool changer; and
   a third electrical contact conductively connected to the electrical lead and configured to engage with the first electrical contact of the tooling unit.

6. The head tool changer of claim 4, wherein the master unit comprises:
   an electrical lead configured to receive the electrical power relayed to the tooling unit from the deposition-based digital manufacturing system; and
   a third electrical contact conductively connected to the electrical lead and configured to engage with the second electrical contact of the tooling unit.

7. The head tool changer of claim 1 further comprising a tool rest assembly operably mounted to the deposition-based digital manufacturing system, the tool rest assembly configured to engage with the tooling unit.

8. The head tool changer of claim 7, wherein the tool rest assembly comprises a purge trap that is configured to be operably connected to a vacuum line.

9. The head tool changer of claim 7, wherein the tool rest assembly is further configured to relay electrical power and control signals to the tooling unit when engaged with the tooling unit.

10. A head tool changer for use with a deposition-based digital manufacturing system for building layer-based three-dimensional models, the head tool changer comprising:
    a plurality of tooling units, each tooling unit being configured to retain a respective deposition head of the deposition-based digital manufacturing system;
    a master unit operably mounted to a gantry of the deposition-based digital manufacturing system, wherein the tooling units are configured to interchangeably engage with the master unit such that only one of the plurality of tool units engages the master unit at any given time;
    a plurality of actuator assemblies operably mounted to the deposition-based digital manufacturing system, wherein at least a portion of each of the plurality of actuator assemblies is configured to move along an axis toward the master unit; and
    a plurality of grip units, wherein each grip unit is secured to one of the plurality of actuator assemblies, each grip unit being configured to detachably engage with one of the plurality of tooling units;
    wherein the grip units are each configured to relay electrical power to the respective tooling unit attached thereto, and wherein the relay of electrical power from one of the grip units to the respective tooling unit attached thereto is configured to be cut upon the respective tooling unit being disengaged from the one grip unit and being engaged with the master unit.

11. The head tool changer of claim 10, wherein the electrical power relayed from each grip unit to the respective tooling unit attached thereto is configured to power the deposition head secured to the respective tooling unit.

12. The head tool changer of claim 11, wherein each grip unit is further configured to relay control signals to the respective tooling unit attached thereto, the relayed control signals being configured to operate the deposition head secured to the respective tooling unit.

13. The head tool changer of claim 10, wherein the master unit is configured to relay electrical power to one of the plurality of tooling units at a given time, the relayed electrical power being configured to power the deposition head secured to the one tooling unit.

14. The head tool changer of claim 10, wherein each tooling unit comprises:
- a first lock component configured to lock with a portion of the respective grip unit attached thereto; and
- a second lock component configured to lock with a portion of the master unit.

* * * * *